United States Patent
Kojima et al.

(10) Patent No.: US 9,811,493 B2
(45) Date of Patent: Nov. 7, 2017

(54) SEMICONDUCTOR DEVICE

(71) Applicant: TOSHIBA MEMORY CORPORATION, Minato-ku (JP)

(72) Inventors: Masatsugu Kojima, Kamakura (JP); Mitsuhiro Abe, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 97 days.

(21) Appl. No.: 14/843,497

(22) Filed: Sep. 2, 2015

(65) Prior Publication Data

US 2016/0350253 A1     Dec. 1, 2016

Related U.S. Application Data

(60) Provisional application No. 62/168,221, filed on May 29, 2015.

(51) Int. Cl.
    *G06F 13/40*          (2006.01)
    *G06F 13/42*          (2006.01)

(52) U.S. Cl.
    CPC ...... *G06F 13/4027* (2013.01); *G06F 13/4221* (2013.01)

(58) Field of Classification Search
    CPC ............. G06F 13/4059; G06F 13/4027; G06F 13/4221
    USPC .......................................... 710/310, 312, 58
    See application file for complete search history.

(56) References Cited

U.S. PATENT DOCUMENTS

| | | | |
|---|---|---|---|
| 5,526,506 A * | 6/1996 | Hyatt ................. | B60R 16/0373 711/111 |
| 6,529,988 B1 * | 3/2003 | Yoshikawa ......... | G06F 13/4027 710/305 |
| 6,671,754 B1 * | 12/2003 | Farwell ..................... | G06F 5/06 710/36 |
| 7,852,675 B2 | 12/2010 | Maejima | |
| 8,372,720 B2 | 2/2013 | Fukuzumi et al. | |
| 8,952,426 B2 | 2/2015 | Maejima | |
| 2006/0190638 A1 * | 8/2006 | Castlebary ............... | G06F 5/10 710/52 |
| 2011/0284946 A1 | 11/2011 | Kiyotoshi | |
| 2016/0350253 A1 * | 12/2016 | Kojima ............... | G06F 13/4221 |

* cited by examiner

*Primary Examiner* — Christopher Shin
(74) *Attorney, Agent, or Firm* — Oblon, McClelland, Maier & Neustadt, L.L.P.

(57) ABSTRACT

According to one embodiment, a semiconductor device includes an input/output circuit. An input/output circuit includes first to third circuits. The first circuit transmits one of first to third data to the second circuit. The second circuit outputs the data, in a first-in-first-out (FIFO) format. The third circuit transmits first clock signal to the first circuit when the first circuit outputs one of the first and second data. When the one of the first and second data is read, the second circuit receives the one of the first and second data in response to the first clock signal within a period until a first signal is received. When the third data is read, the second circuit receives the third data in response to a second clock signal within the period.

12 Claims, 30 Drawing Sheets

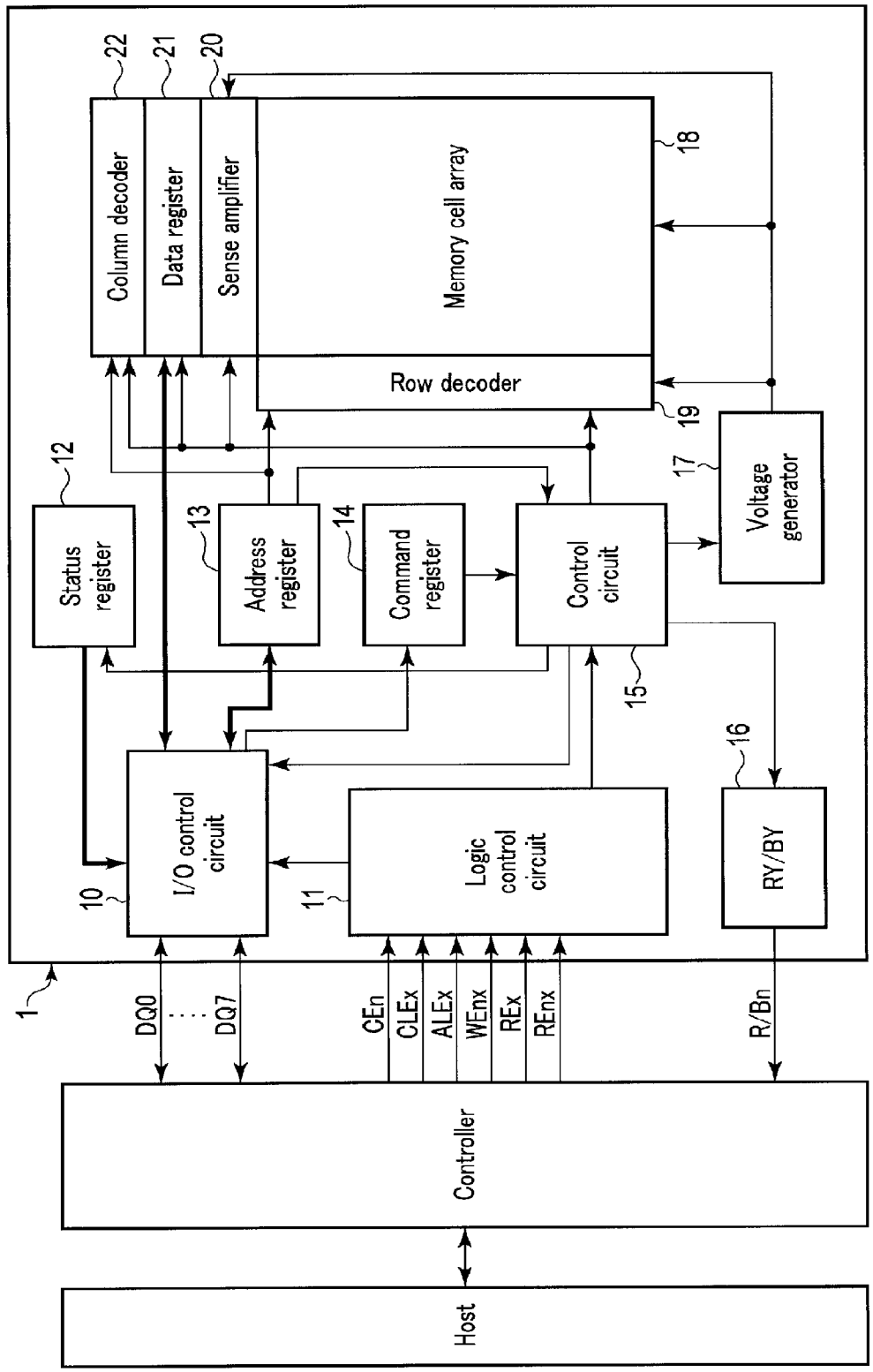
F I G. 1

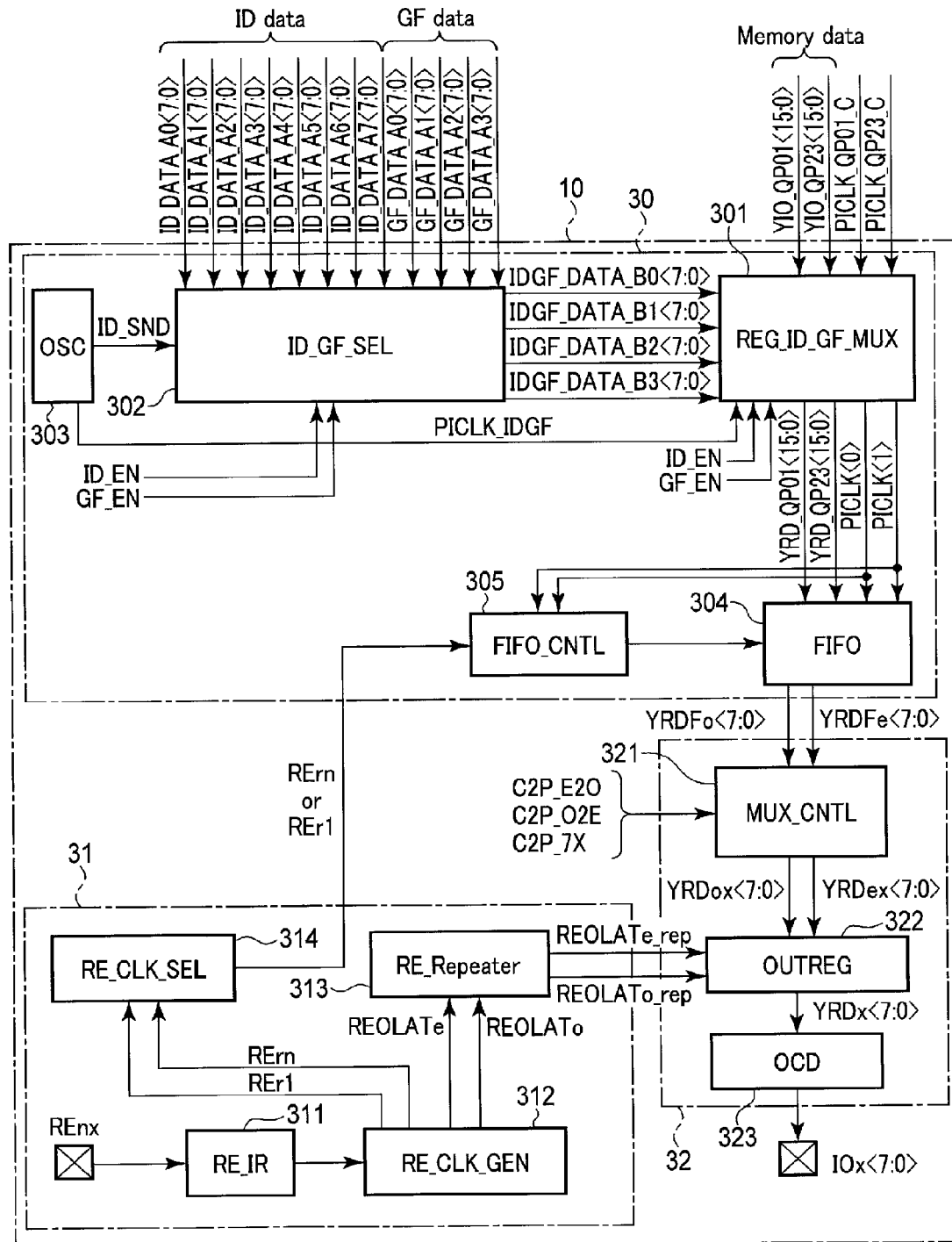
F I G. 2

| OUTPUT | INPUT | | |
|---|---|---|---|
| | GF data | ID data | |
| | GF_EN="H"<br>ID_EN="L" | GF_EN="L"<br>ID_EN="H"<br>ID_SND="L" | GF_EN="L"<br>ID_EN="H"<br>ID_SND="H" |
| IDGF_DATA_B0<7:0> | GF_DATA_A0<7:0> | ID_DATA_A0<7:0> | ID_DATA_A4<7:0> |
| IDGF_DATA_B1<7:0> | GF_DATA_A1<7:0> | ID_DATA_A1<7:0> | ID_DATA_A5<7:0> |
| IDGF_DATA_B2<7:0> | GF_DATA_A2<7:0> | ID_DATA_A2<7:0> | ID_DATA_A6<7:0> |
| IDGF_DATA_B3<7:0> | GF_DATA_A3<7:0> | ID_DATA_A3<7:0> | ID_DATA_A7<7:0> |

FIG. 4

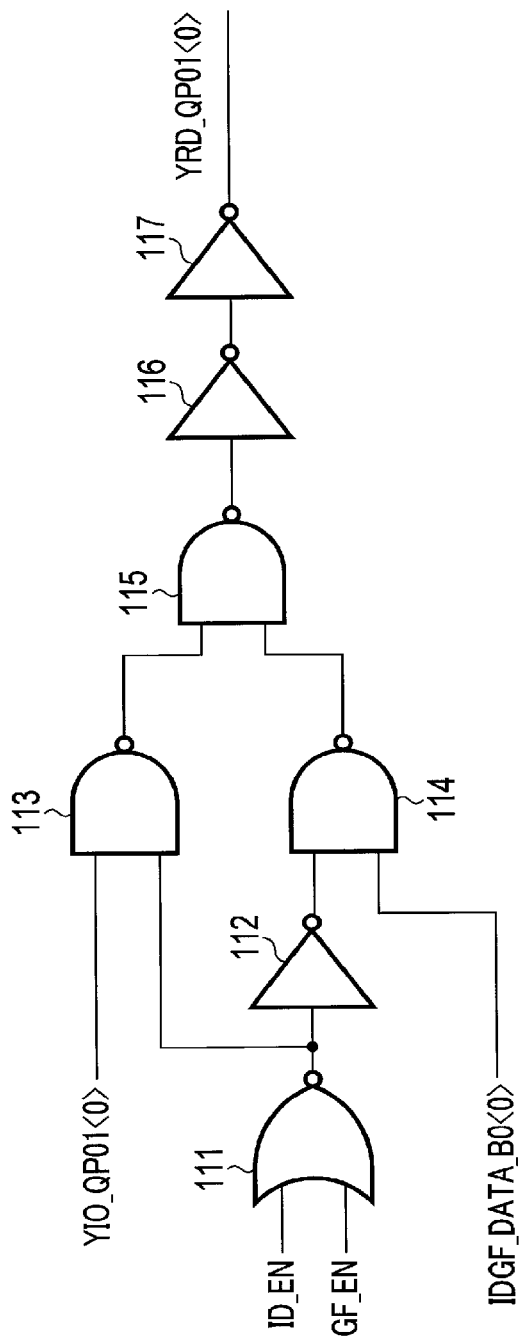
F I G. 5

| OUTPUT | INPUT | |
|---|---|---|
| | Memory data | ID/GF data |
| | ID_EN="L" and GF_EN="L" | ID_EN="H" or GF_EN="H" |
| YRD_QP01<7:0> | YIO_QP01<7:0> | IDGF_DATA_B0<7:0> |
| YRD_QP01<15:8> | YIO_QP01<15:8> | IDGF_DATA_B1<7:0> |
| YRD_QP23<7:0> | YIO_QP23<7:0> | IDGF_DATA_B2<7:0> |
| YRD_QP23<15:8> | YIO_QP23<15:8> | IDGF_DATA_B3<7:0> |
| PICLK<0> | PICLK_QP01_C | PICLK_IDGF |
| PICLK<1> | PICLK_QP23_C | |

F I G. 6

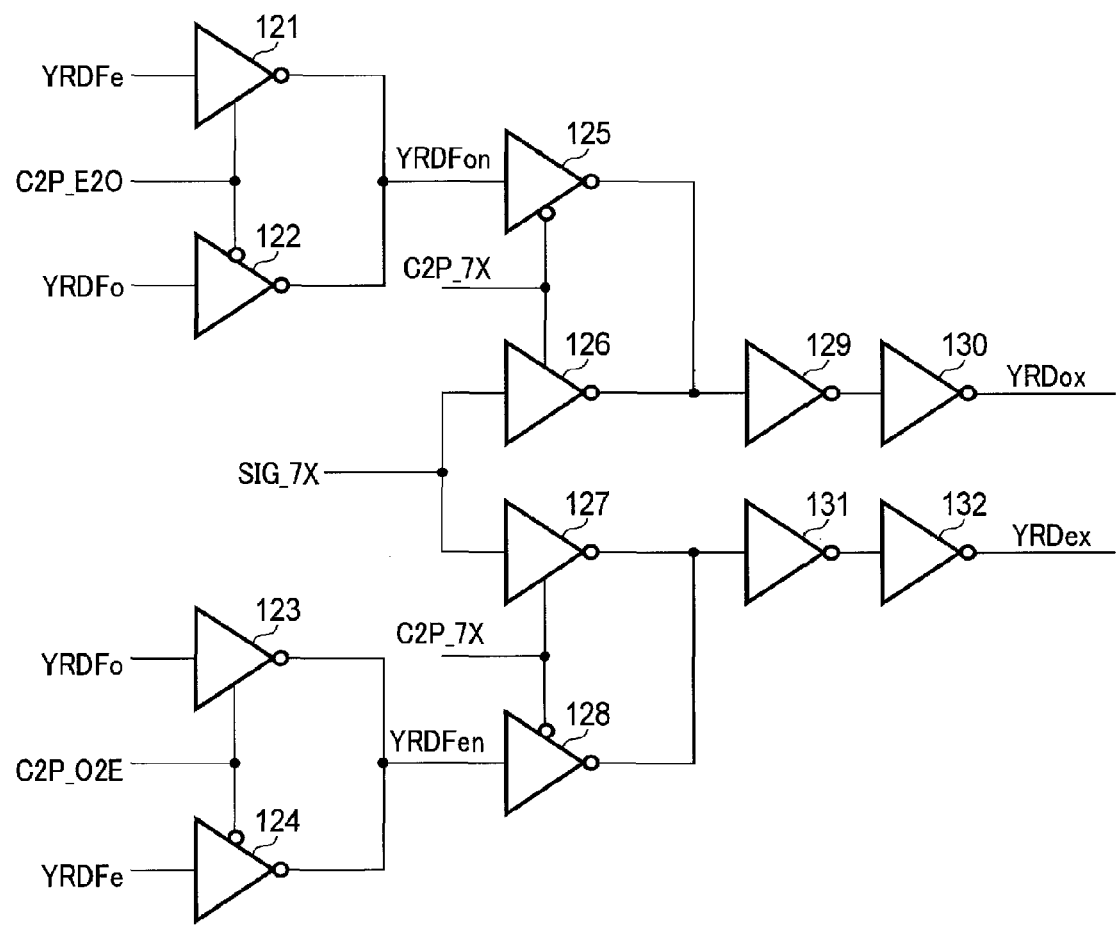
F I G. 7

| OUTPUT | INPUT | | | | |
|---|---|---|---|---|---|
| | Memory data | ID data | | GFdata | |
| | C2P_E2O="L"<br>C2P_O2E="L"<br>C2P_7X="L" | C2P_E2O="H"<br>C2P_7X="L" | C2P_E2O="L"<br>C2P_7X="L" | C2P_O2E="L"<br>C2P_7X="L" | C2P_O2E="H"<br>C2P_7X="L" |
| YRDox⟨7:0⟩ | YRDFo⟨7:0⟩ | YRDFe⟨7:0⟩ | YRDFo⟨7:0⟩ | – | C2P_O2E="H"<br>C2P_7X="L" |
| YRDex⟨7:0⟩ | YRDFe⟨7:0⟩ | – | – | YRDFe⟨7:0⟩ | YRDFo⟨7:0⟩ |

F I G. 8

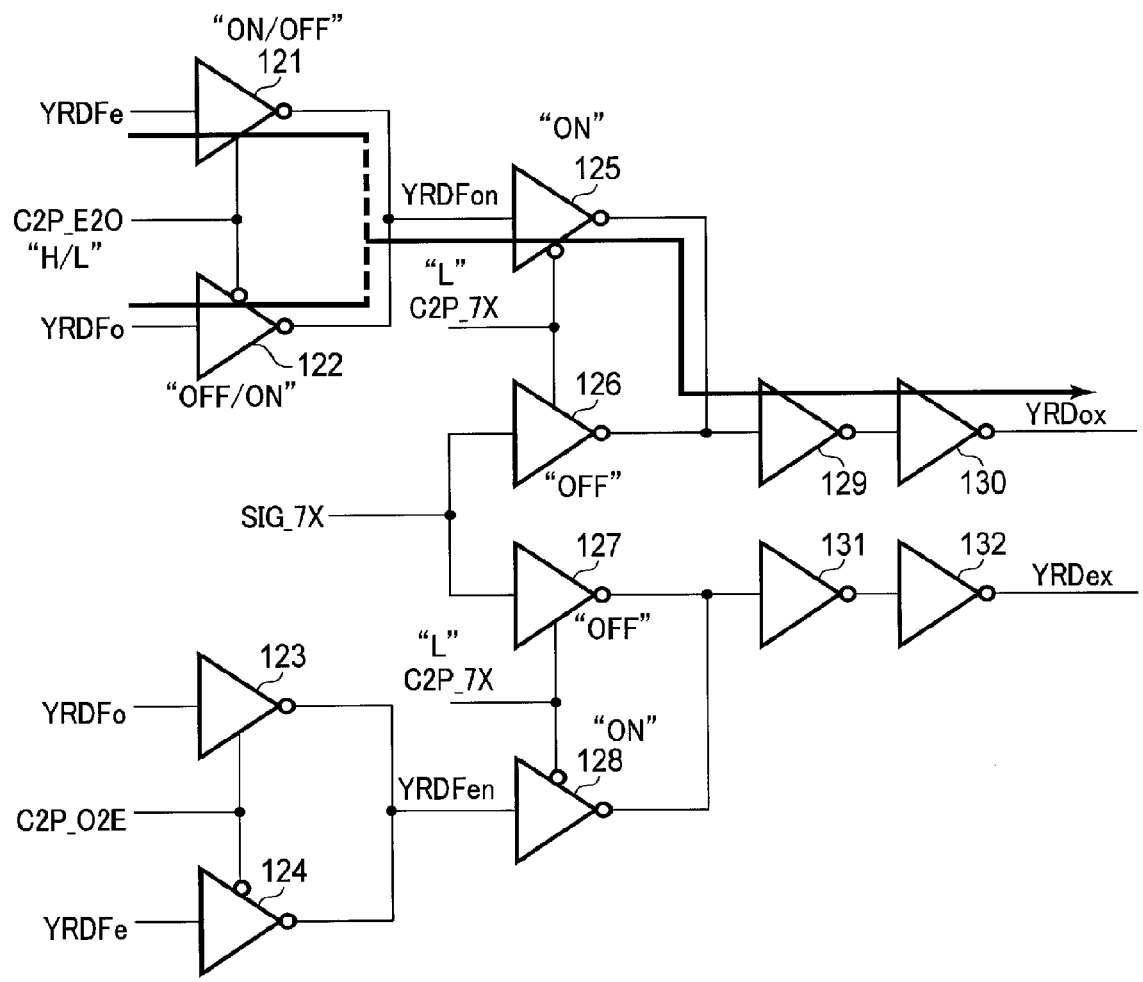
F I G. 10

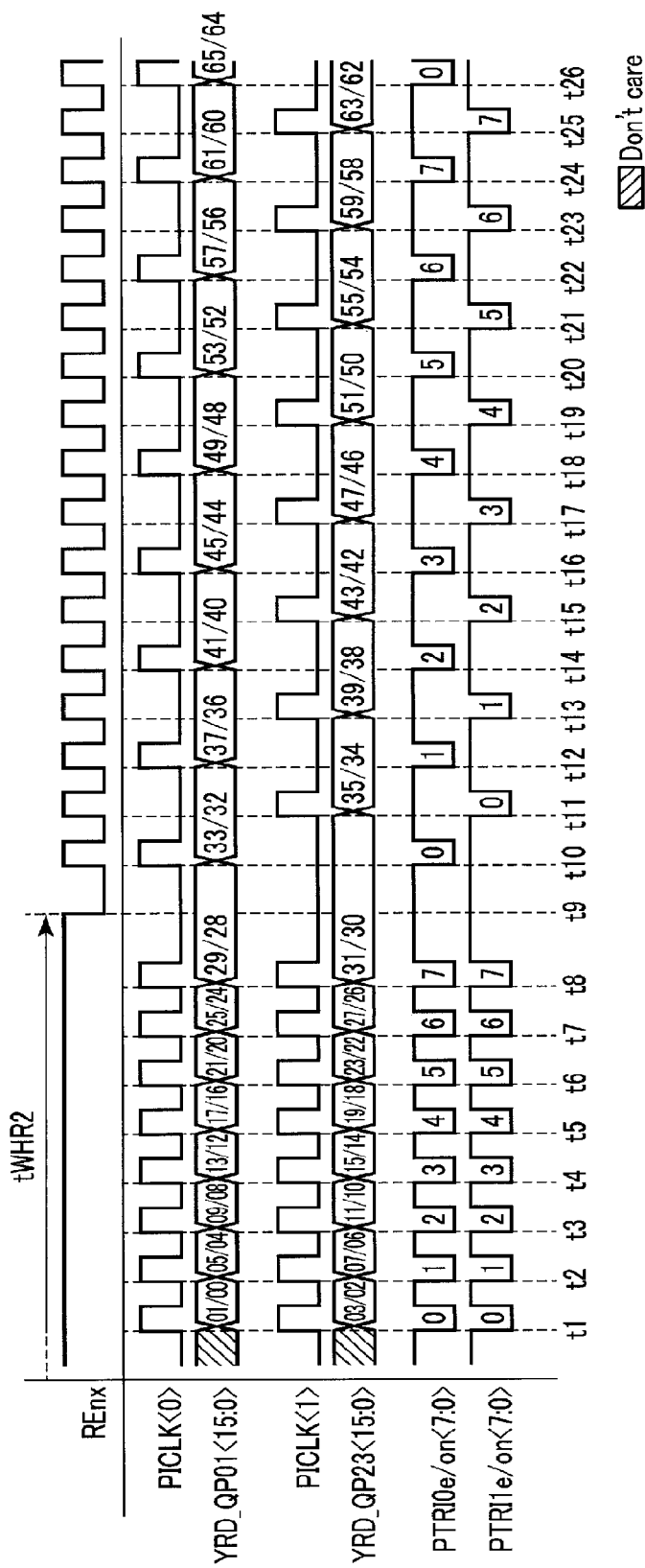
F I G. 13A

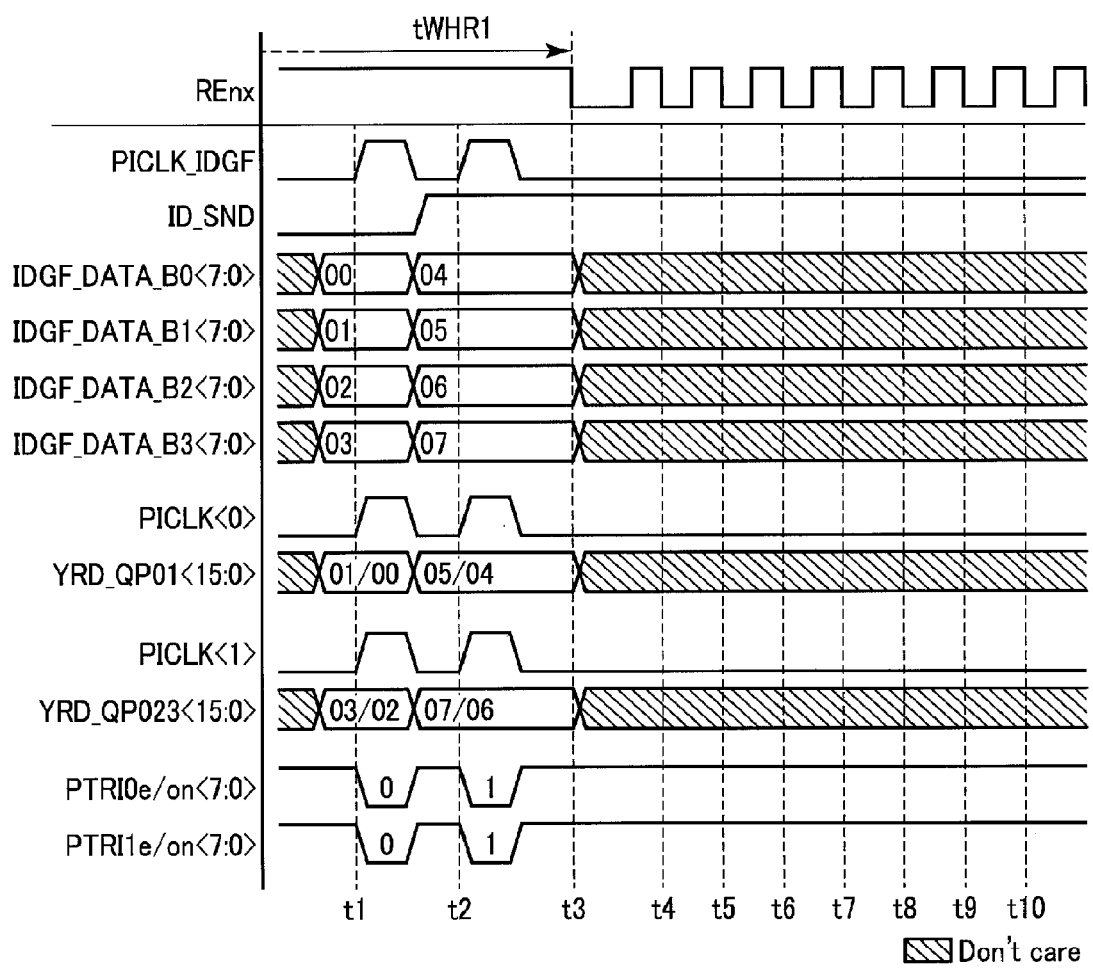
F I G. 15A

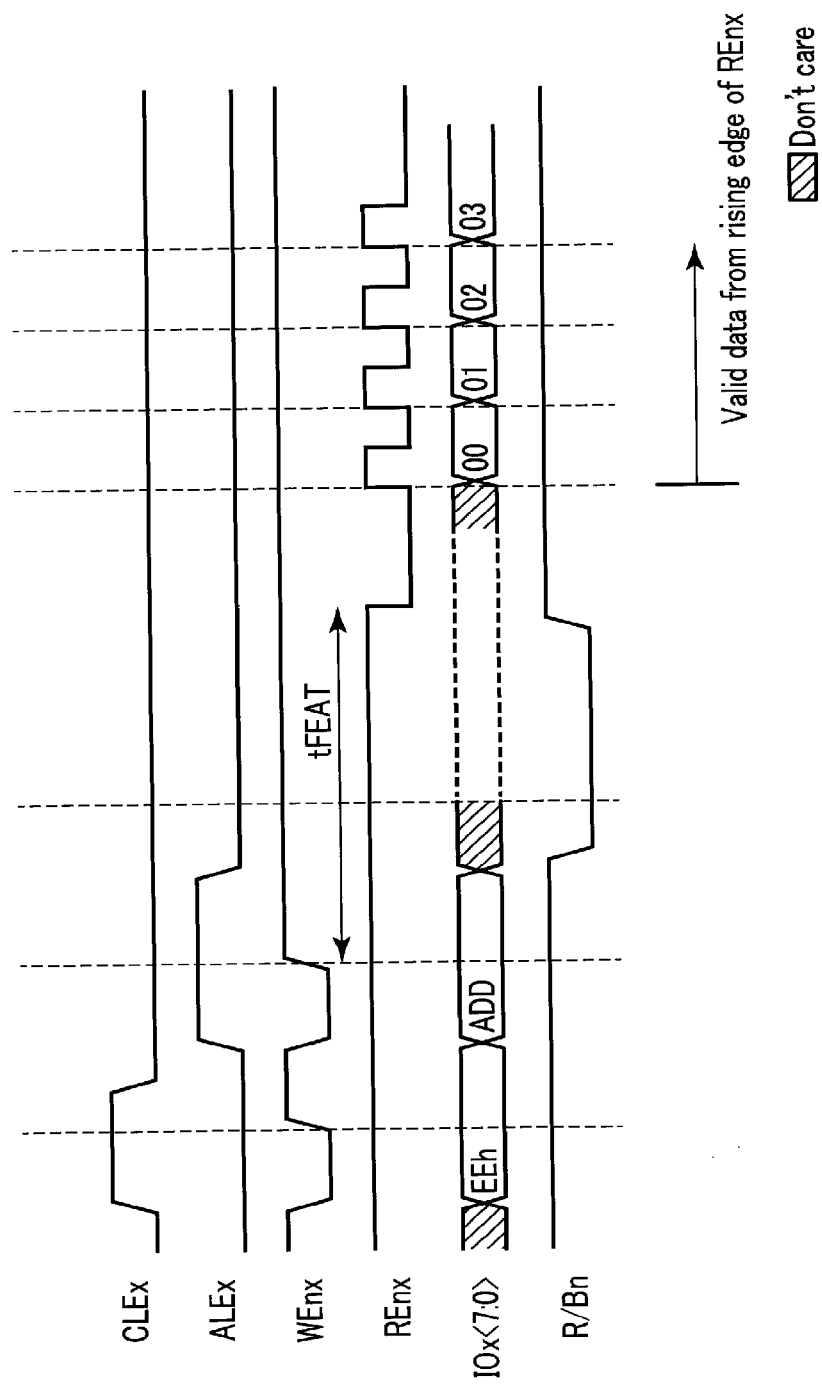
F I G. 16

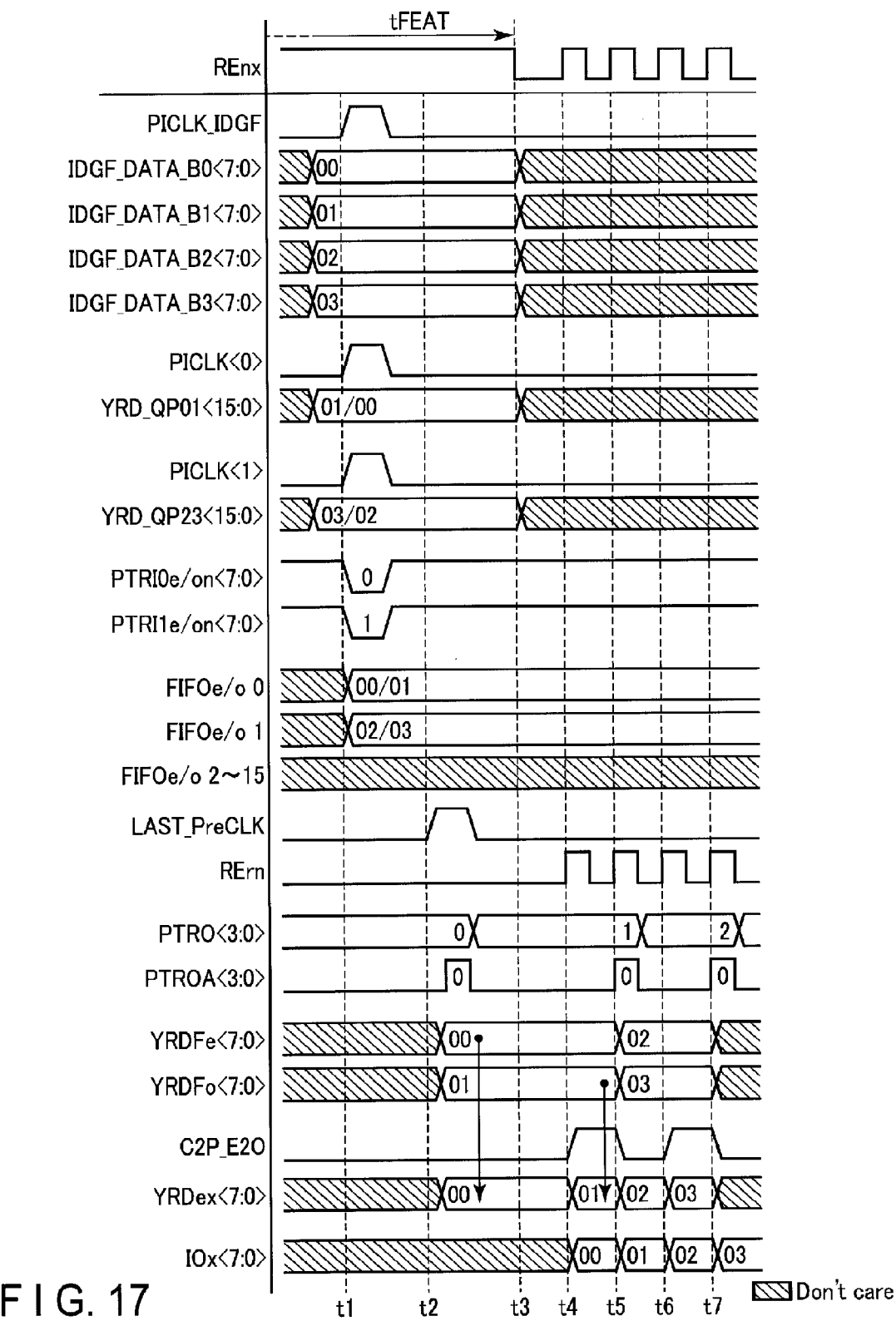
F I G. 17

| OUTPUT | INPUT | |
|---|---|---|
| | Memory data | ID/GF data |
| | ID_EN="L" and GF_EN="L" | ID_EN="H" or GF_EN="H" |
| YRD_QP0<7:0> | YIO_QP0<15:0> | IDGF_DATA_B0<7:0> |
| YRD_QP0<15:8> | | IDGF_DATA_B0<7:0> |
| YRD_QP1<7:0> | YIO_QP1<15:0> | IDGF_DATA_B1<7:0> |
| YRD_QP1<15:8> | | IDGF_DATA_B1<7:0> |
| YRD_QP2<7:0> | YIO_QP2<15:0> | IDGF_DATA_B2<7:0> |
| YRD_QP2<15:8> | | IDGF_DATA_B2<7:0> |
| YRD_QP3<7:0> | YIO_QP3<15:0> | IDGF_DATA_B3<7:0> |
| YRD_QP3<15:8> | | IDGF_DATA_B3<7:0> |
| PICLK<1> | PICLK_QP0_C | |
| PICLK<2> | PICLK_QP1_C | PICLK_IDGF |
| PICLK<3> | PICLK_QP2_C | |
| PICLK<4> | PICLK_QP3_C | |

F I G. 20

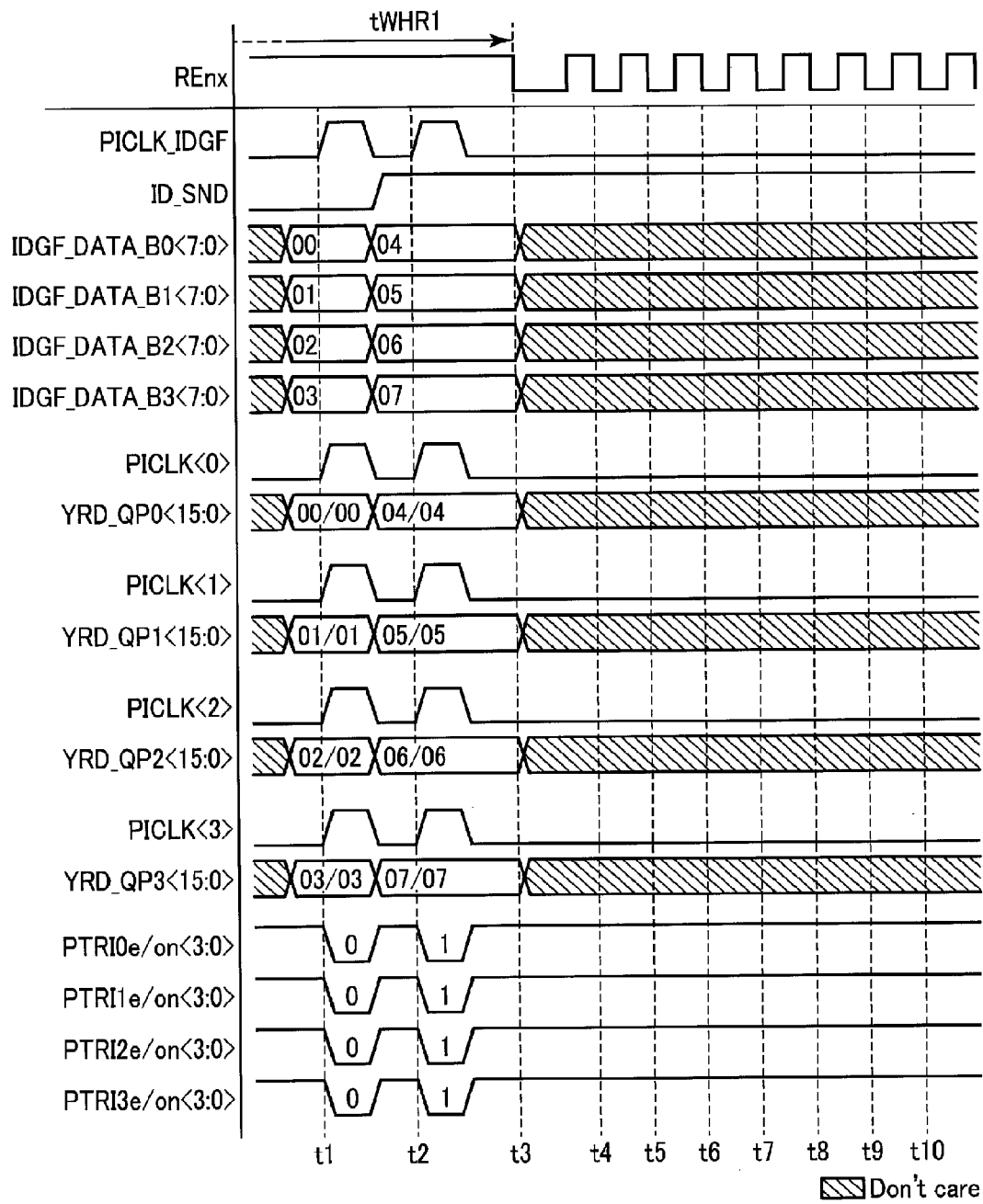
F I G. 22A

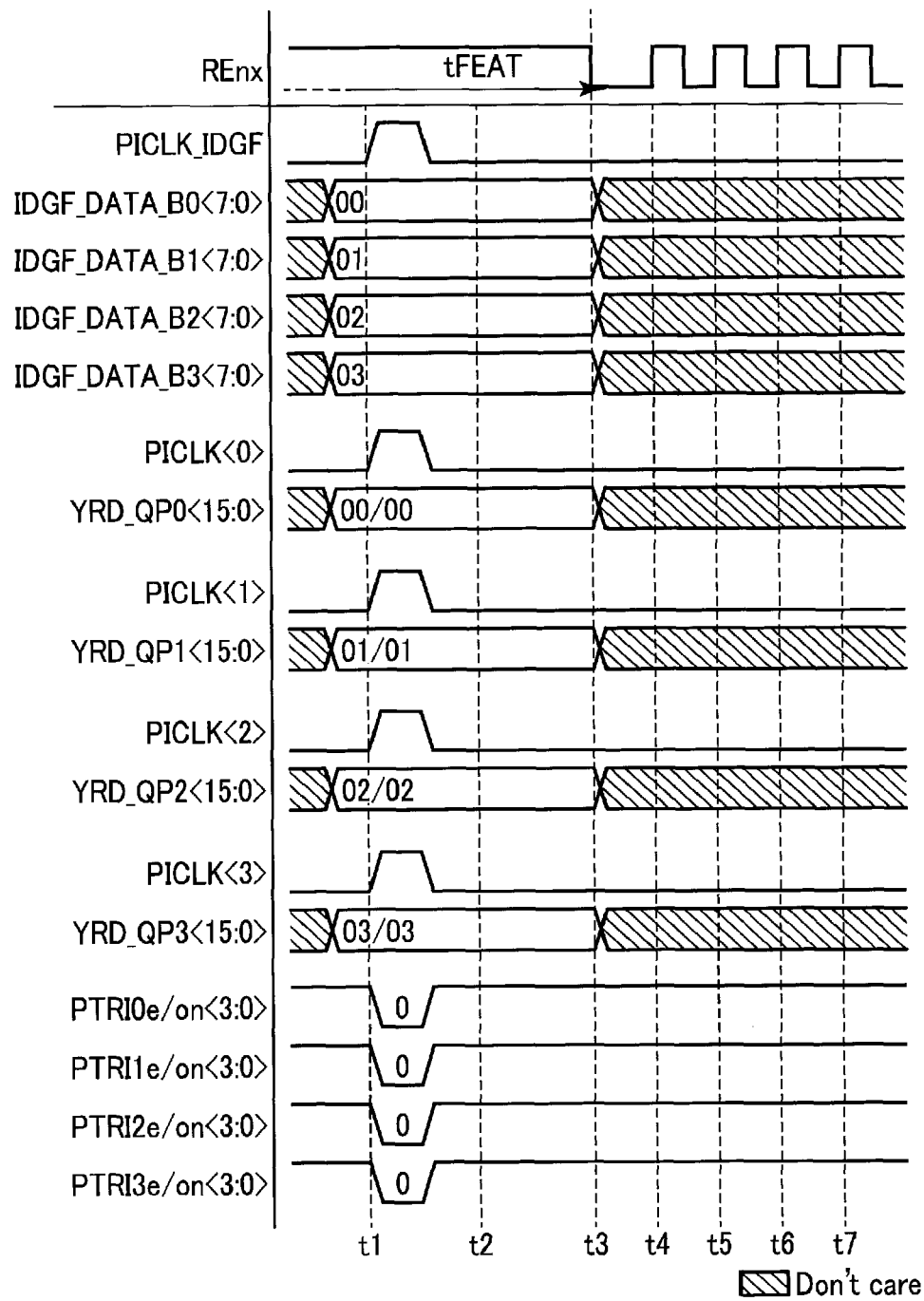
F I G. 23A

SEMICONDUCTOR DEVICE

CROSS-REFERENCE TO RELATED APPLICATIONS

This application claims the benefit of U.S. Provisional Application No. 62/168,221, filed May 29, 2015, the entire contents of which are incorporated herein by reference.

FIELD

Embodiments described herein relate generally to a semiconductor device.

BACKGROUND

Regarding a semiconductor device, high-speed data output is in progress.

BRIEF DESCRIPTION OF THE DRAWINGS

FIG. 1 is a block diagram of a semiconductor device according to a first embodiment;

FIG. 2 is a block diagram of an I/O control circuit included in the semiconductor device according to the first embodiment;

FIG. 4 is a table showing input/output data of the selector (ID_GF_SEL) included in the semiconductor device according to the first embodiment;

FIG. 5 is a circuit diagram of a multiplexer (REG_ID_GF_MUX) included in the semiconductor device according to the first embodiment;

FIG. 6 is a table showing input/output data of the multiplexer (REG_ID_GF_MUX) included in the semiconductor device according to the first embodiment;

FIG. 7 is a circuit diagram of a multiplexer (MUX_CNTL) included in the semiconductor device according to the first embodiment;

FIG. 8 is a table showing input/output data of the multiplexer (MUX_CNTL) included in the semiconductor device according to the first embodiment;

FIG. 10 is a circuit diagram upon ID data transmission of the multiplexer (MUX_CNTL) included in the semiconductor device according to the first embodiment;

FIGS. 13A, 13B, and 13C are timing charts of data output upon register read in the I/O control circuit included in the semiconductor device according to the first embodiment;

FIGS. 15A and 15B are timing charts of data output upon ID read in the I/O control circuit included in the semiconductor device according to the first embodiment;

FIG. 16 is a command sequence upon Get Feature in the semiconductor device according to the first embodiment;

FIG. 17 is a timing chart of data output upon Get Feature in the I/O control circuit included in the semiconductor device according to the first embodiment;

FIG. 20 is a table showing input/output data of a multiplexer (REG_ID_GF_MUX) included in the semiconductor device according to the second embodiment;

FIGS. 22A and 22B are timing charts of data output upon ID read in the I/O control circuit included in the semiconductor device according to the second embodiment; and FIGS. 23A and 23B are timing charts of data output upon Get Feature in the I/O control circuit included in the semiconductor device according to the second embodiment.

DETAILED DESCRIPTION

Figure 3:
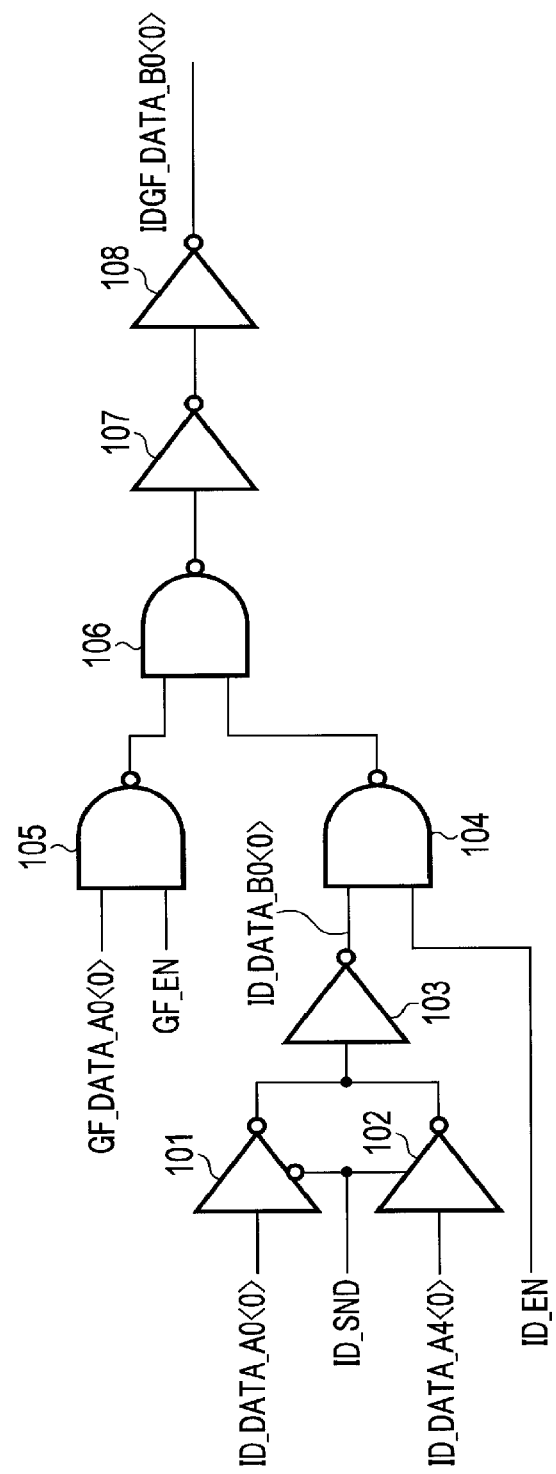
FIG. 3 is a circuit diagram of a selector (ID_GF_SEL) included in the semiconductor device according to the first embodiment.

In general, according to one embodiment, a semiconductor device includes an input/output circuit electrically connected to an external controller. The input/output circuit includes: a first circuit configured to electrically connect one of first data bus input one of first and second data and second data bus input a third data with a third data bus, and electrically connect the one of first signal line input a first clock signal and second signal line input a second clock signal with a third signal line; a second circuit configured to output one of the first to third data, which are input from the third data bus, in a first-in-first-out (FIFO) format; and a third circuit configured to generate the first clock signal and supply the first clock signal to the first circuit through the first signal line. When the one of the first and second data is read, the second circuit receives the one of the first and second data in response to the first clock signal within a period until a first signal is received after a read command and address data are received from the external controller. When the third data is read, the second circuit receives the third data in response to the second clock signal within the period.

1 First Embodiment

A semiconductor device according to a first embodiment will be described.

1.1. Entire Configuration of Semiconductor Device

First, the entire configuration of the semiconductor device according to the present embodiment will be described with reference to FIG. 1. Hereinafter, as the semiconductor device, a NAND flash memory will be described as an example. As illustrated, the NAND flash memory 1 according to the present embodiment is connected to a controller. The controller is connected to a host device to receive instructions such as data write, data read, and data erase operation from the host device. The controller issues commands in response to these instructions and transmits the commands to the NAND flash memory 1. The NAND flash memory 1 controls a data read operation, a data write operation, and a data erase operation by the received commands. In FIG. 1, some of the connections between the respective blocks are indicated by solid arrow lines, but the connections between the blocks are not limited thereto.

As illustrated, the NAND flash memory 1 includes an I/O control circuit 10, a logic control circuit 11, a status register 12, an address register 13, a command register 14, a control circuit 15, a ready/busy circuit 16, a voltage generator 17, a memory cell array 18, a row decoder 19, a sense amplifier 20, a data register 21, and a column decoder 22.

The logic control circuit 11 receives, for example, a chip enable signal CEn, a command latch enable signal CLEx, an address latch enable signal ALEx, a write enable signal WEnx, and read enable signals REx and REnx. The logic control circuit 11 controls the I/O control circuit 10 and the control circuit 15 in response to the received signals.

The chip enable signal CEn is a signal for enabling the NAND flash memory 1 and is asserted at a low level. The command latch enable signal CLEx is a signal indicating that an input/output signal I/O is a command, and is asserted at a high level. The address latch enable signal ALEx is a signal indicating that the input/output signal I/O is an address, and is asserted at a high level. The write enable signal WEnx is a signal for fetching the received signal into the NAND flash memory 1 and is asserted at a low level whenever the command, the address, and the data are received from the controller. Therefore, whenever WEnx is toggled, the signal is fetched into the NAND flash memory 1. The read enable signals REx and REnx are signals for enabling the controller to read each data from the NAND flash memory 1. For example, the read enable signal REnx is asserted at a low level, and the read enable signal REx is asserted at a high level.

The I/O control circuit 10 controls the input and output of an 8-bit input/output signal I/O<0> to I/O<7> that is transmitted and received between the controller and the NAND flash memory 1 through data lines DQ0 to DQ7. More specifically, the I/O control circuit 10 includes an input circuit and an output circuit, and the input circuit receives a command signal, an address signal, and data and transmits them to the command register 14, the address register 13, and the data register 21. In addition, the output circuit transmits various data held by the NAND flash memory 1 to the controller in response to the instruction from the controller. The various data include, for example, memory data, ID data, parameter information, and status information. The memory data is, for example, data held in the data register 21. The ID data is unique identification information of the NAND flash memory 1, such as a product number, a memory capacity and an interface specification. The parameter information is information such as a set value of a read voltage in a read operation. The status information is, for example, information indicating the result of the write operation or the like. Hereinafter, an operation of reading the memory data from the data register 21 is referred to as a "register read", an operation of reading the ID data is referred to as an "ID read", an operation of reading the parameter information is referred to as a "Get Feature", and data output by the Get Feature is referred to as "GF data".

The command register 14 temporarily stores a command signal received from the controller through the I/O control circuit 10 and transmits the command signal to the control circuit 15.

The control circuit 15 controls the status register 12, the ready/busy circuit 16, the voltage generator 17, the row decoder 19, the sense amplifier 20, the data register 21, and the column decoder 22 in response to the command signal held by the command register 14, and performs the data read operation, the data write operation, and the data erase operation.

The status register 12 temporarily holds a status in, for example, the data read operation, the data write operation, and the data erase operation, and notifies the controller of whether the operation has been normally completed.

The ready/busy circuit 16 transmits a ready/busy signal R/Bn to the controller according to an operation condition of the control circuit 15. The ready/busy signal R/Bn is a signal indicating whether the NAND flash memory 1 is in a busy state (whether the NAND flash memory is in a state where the command is non-receivable from the controller or is in a state where the command is receivable from the controller) and is at a low level in the busy state.

The voltage generator 17 generates voltages necessary for the data read operation, the data write operation, and the data erase operation and applies the voltages to the memory cell array 18, the row decoder 19, and the sense amplifier 20, for example, through a driver (not illustrated).

The memory cell array 18 includes a plurality of non-volatile memory cell transistors (not illustrated). For example, the memory cell transistor includes a control gate and a charge accumulation layer, changes a threshold of the transistor by holding charges or holes in the charge accumulation layer, and holds data corresponding to the threshold level. The memory cell transistors may be two-dimensionally disposed on a semiconductor substrate and may be three-dimensionally stacked above the semiconductor substrate.

In addition, the configuration of the memory cell array 18 in the three-dimensional stack type NAND flash memory is disclosed in, for example, U.S. patent application Ser. No. 12/407,403, filed on Mar. 19, 2009, entitled "THREE DIMENSIONAL STACKED NONVOLATILE SEMICONDUCTOR MEMORY". In addition, it is disclosed in U.S. patent application Ser. No. 12/406,524, filed on Mar. 18, 2009, entitled "THREE DIMENSIONAL STACKED NON-VOLATILE SEMICONDUCTOR MEMORY", U.S. patent application Ser. No. 12/679,991, filed on Mar. 25, 2010, entitled "NON-VOLATILE SEMICONDUCTOR STORAGE DEVICE AND METHOD OF MANUFACTURING THE SAME", and U.S. patent application Ser. No. 12/532,030, filed on Mar. 23, 2009, entitled "SEMICONDUCTOR MEMORY AND METHOD FOR MANUFACTURING SAME. These patent applications are incorporated herein by reference in their entirety.

In addition, the memory cell transistor is connected to a word line (not illustrated) and a bit line (not illustrated) and is selected by the word line and the bit line.

The address register 13 temporarily holds an address signal received from the controller through the I/O control circuit 10. Then, the address register 13 transmits a row address to the row decoder 19 and transmits a column address to the column decoder 22.

For example, in the data write operation and the read operation, the row decoder 19 decodes the row address and selects the word line according to the decoding result. Then, the row decoder 19 applies an appropriate voltage to the word line.

For example, in the data write operation and the read operation, the column decoder 22 decodes the column address and selects a latch circuit inside the data register 21 according to the decoding result.

The data register 21 includes a plurality of latch circuits (not illustrated). The latch circuits correspond to the respective bit lines and hold write data and read data. For example, in the data write operation, the data register 21 temporarily holds data received from the controller through the I/O control circuit 10. In addition, for example, in the data read operation, the data register 21 temporarily holds data read by the sense amplifier 20 and transmits the data to the controller through the I/O control circuit 10.

In the data read operation, the sense amplifier 20 senses data read from the bit line from the memory cell transistor connected to the selected word line. In addition, in the data write operation, the sense amplifier 20 transmits the write data to the memory cell transistor connected to the selected word line. Hereinafter, the unit of data to be read and written in a batch by the sense amplifier 20 is referred to as a "page".

1.2 Configuration of I/O Control Circuit

Next, details of the configuration of the I/O control circuit 10 will be described with reference to FIG. 2, particularly focusing on the output circuit.

As illustrated, the output circuit of the I/O control circuit 10 includes an output data control unit 30, a clock signal generation unit 31, and an output unit 32.

The clock signal generation unit 31 generates a clock signal in response to the read enable signal REnx. Specifically, the clock signal generation unit 31 includes a receiver (hereinafter, referred to as "RE_IR") 311, a clock generator (hereinafter, referred to as "RE_CLK_GEN") 312, a repeater (hereinafter, referred to as "RE_Repeater") 313, and a clock selector (hereinafter, referred to as "RE_CLK_SEL") 314.

The RE_IR 311 adjusts a voltage of the read enable signal REnx, which is received from the controller, to an appropriate value.

The RE_CLK_GEN 312 generates clock signals REOLATe, REOLATo, RErn, and RErl, based on the read enable signal REnx received from the RE_IR 311. The clock signals REOLATe and REOLATo are opposite-phase signals that are mutually synchronized at the same frequency as the read enable signal REnx, and are used when data is output from the output unit 32 to the controller. The clock signal RErn is, for example, an in-phase signal having the same frequency as the read enable signal REnx and is a clock signal that is used in the output data control unit 30 upon the register read or Get Feature. The clock signal RErl is, for example, an opposite-phase signal having the same frequency as the read enable signal REnx and is a clock signal that is used in the output data control unit 30 upon the ID read. Therefore, the clock signals RErn and RErl are mutually opposite-phase signals. For example, in the RE_CLK_GEN 312, the clock signal RErl is inverted to the opposite phase of the clock signal RErn by making the number of gate stages when generating the clock signal RErn and the number of gate stages when generating the clock signal RErl differ by one stage. The number of the gate stages as used herein represents the number of circuits provided in a clock signal transmission path to invert the clock signal, for example, the number of inverters or the like. Since the clock signals are input to the gates, these circuits represent the number (number of stages) of the gates. The case of using the same clock signal RErn upon the register read and Get Feature has been described, but different clock signals may be used. In this case, for example, in the RE_CLK_GEN 312, the in-phase clock signals are generated by making the number of the gate stages when generating the clock signal used upon the register read and the number of the gate stages when generating the clock signal used upon the Get Feature equal to each other.

The RE_Repeater 313 is used to reproduce a signal when the clock signals REOLATe and REOLATo are transmitted from the RE_CLK_GEN 312 to the output unit 32. Then, the RE_Repeater 313 generates mutually opposite-phase clock signals REOLATe_rep and REOLATo_rep at the same frequency as the read enable signal REnx by correcting the clock signals REOLATe and REOLATo, and transmits them to the output unit 32. The number of the RE_Repeaters 313 is not limited to one and may be zero or more than one.

The RE_CLK_SEL 314 transmits either the clock signal RErn or the clock signal RErl to the output data control unit 30, for example, according to the type of output data. More specifically, the RE_CLK_SEL 314 transmits the clock signal RErn upon the register read or the Get Feature and transmits the clock signal RErl upon the ID read.

Next, the output data control unit 30 will be described. The output data control unit 30 integrates data input from a plurality of different data buses and transmits the integrated data to the output unit 32. In addition, the output data control unit 30 includes a multiplexer (hereinafter, referred to as "REG_ID_GF_MUX") 301, a selector (hereinafter, referred to as "ID_GF_SEL") 302, an oscillator (hereinafter, referred to as "OSC") 303, a first-in-first-out (FIFO)-format buffer circuit (hereinafter, referred to as "FIFO") 304, and a control circuit of the FIFO 304 (hereinafter, referred to as "FIFO_CNTL") 305.

The ID_GF_SEL 302 receives ID data from 64-bit data buses ID_DATA_A0<7:0> to ID_DATA_A7<7:0> and receives GF data from 32-bit data buses GF_DATA_A0<7:0> to GF_DATA_A4<7:0>. In addition, the ID_GF_SEL 302 receives an ID data enable signal ID_EN and a GF data enable signal GF_EN from the control circuit 15. The ID data enable signal ID_EN is a signal that enables the reception of the ID data in the I/O control circuit 10. In addition, the GF data enable signal GF_EN is a signal that enables the reception of the GF data in the I/O control circuit 10. The ID_GF_SEL 302 selects one of the ID data and the GF data in response to the received ID data enable signal ID_EN and the received GF data enable signal GF_EN and transmits the ID data or the GF data to the REG_ID_GF_MUX 301 through 32-bit data buses IDGF_DATA_B0<7:0> to IDGF_DATA_B3<7:0>.

The OSC 303 generates a clock signal PICLK_IDGF necessary when the FIFO 304 fetches the ID data or the GF data, and transmits the clock signal PICLK_IDGF to the REG_ID_GF_MUX 301. In addition, the OSC 303 includes, for example, a control circuit (not illustrated), and generates a data select signal ID_SND in the control circuit and transmits the data select signal ID_SND to the ID_GF_SEL 302. The data select signal ID_SND is a signal that is used when an input source of data is switched in the ID_GF_SEL 302. For example, in a case where the ID_GF_SEL 302 receives the ID data, the ID_GF_SEL 302 switches the input source of data to the data buses ID_DATA_A0<7:0> to ID_DATA_A3<7:0> and the data buses ID_DATA_A4<7:0> to ID_DATA_A7<7:0> in response to the data select signal ID_SND.

The REG_ID_GF_MUX 301 receives the memory data from 32-bit data bus YIO_QP01<15:0> and YIO_QP23<15:0>. Then, upon the memory data input, the clock signal PICLK_QP01_C corresponding to the data buses YIO_QP01<15:0> and the clock signal PICLK_QP23_C corresponding to the data buses YIO_QP23<15:0> are received together. In addition, the REG_ID_GF_MUX 301 receives the ID data or the GF data from the data buses IDGF_DATA_B0<7:0> to IDGF_DATA_B3<7:0>. Then, upon the ID data or GF data input, the REG_ID_GF_MUX 301 receives the clock signal PICLK_IDGF from the OSC 303. Then, the REG_ID_GF_MUX 301 selects one of the memory data, the ID data, and the GF data in response to the ID data enable signal ID_EN and the GF data enable signal GF_EN and outputs the selected data to 32-bit data buses YRD_QP01<15:0> and YRD_QP23<15:0>. That is, the REG_ID_GF_MUX 301 selects one of the data buses YIO_QP01<15:0> and YIO_QP23<15:0> and the data buses IDGF_DATA_B0<7:0> to IDGF_DATA_B3<7:0> in response to the ID data enable signal ID_EN and the GF data enable signal GF_EN, and electrically connects the selected data buses to the data buses YRD_QP01<15:0> and YRD_QP23<15:0>. In addition, the REG_ID_GF_MUX 301, which outputs the clock signals PICLK_QP01_C and PICLK_QP23_C as the clock signals PICLK<0> and PICLK<1> when outputting the memory data and outputs the clock signal PICLK_IDGF as the clock signals PICLK<0> and PICLK<1> when outputting the ID data or the GF data.

FIFO 304 includes a plurality of registers (not illustrated) inside. The number (address) of the register in which the data input/output is performed is managed by the FIFO_CNTL 305. Under the control of the FIFO_CNTL 305, the FIFO 304 temporarily stores data received from the data buses YRD_QP01<15:0> and YRD_QP23<15:0> in an internal register and outputs the stored data to the data buses YRDFo<7:0> and YRDFe<7:0>.

The FIFO_CNTL 305 controls the input and output of data to the FIFO 304. Specifically, the FIFO_CNTL 305 includes an input address register (not illustrated), an output address register (not illustrated), and a plurality of counters (not illustrated).

The input address register holds address data (hereinafter, referred to as "input address") of the register when the FIFO 304 fetches data.

The output address register holds address data (hereinafter, referred to as "output address") of the register when the FIFO 304 outputs data.

The counter counts the input address and the output address. For example, in the case of counting the input address, the FIFO_CNTL 305 includes a counter corresponding to the clock signal PICLK<0> received from the REG_ID_GF_MUX 301 and a counter corresponding to the clock signal PICLK<1> received from the REG_ID_GF_MUX 301. In addition, for example, in the case of counting the output address, the FIFO_CNTL 305 includes a counter corresponding to the clock signal RErn or the clock signal RErl. The number of the counters corresponding to each clock signal may be one or may be two or more.

The FIFO_CNTL 305 manages the input address and the output address of the register of the FIFO 304 by using them. Then, the FIFO_CNTL 305 transmits a signal for designating the input address and a signal for designating the output address to the FIFO 304. In addition, the FIFO_CNTL 305 transmits the clock signal RErn or RErl received from the RE_CLK_SEL 314 to the FIFO 304.

Next, the output unit 32 will be described. The output unit 32 outputs data received from the output data control unit 30 to the outside through, for example, eight input/output pads IOx<7:0>. In addition, the output unit 32 includes a multiplexer (hereinafter, referred to as "MUX_CNTL") 321, an output register (hereinafter, referred to as "OUTREG") 322, and an off-chip driver (hereinafter, referred to as "OCD") 323.

The MUX_CNTL 321 receives three signals C2P_E2O, C2P_O2E, and C2P_7X for switching the input source of data, for example, according to the type of data (memory data, ID data, and GF data) from the logic control circuit 11. Then, the MUX_CNTL 321 outputs data received from the data buses YRDFo<7:0> and YRDFe<7:0> to data buses YRDox<7:0> and YRDex<7:0> in response to the signals C2P_E2O, C2P_O2E, and C2P_7X.

The OUTREG 322 includes, for example, a plurality of flip-flops (not illustrated) and outputs the data received from the data buses YRDox<7:0> and YRDex<7:0> to 8-bit data buses YRDx<7:0> at a timing controlled by the clock signal REOLATe_rep and REOLATo_rep. For example, the OUTREG 322 outputs the memory data at a double data rate (DDR) and outputs the ID data and the GF data at a single data rate (SDR).

The OCD 323 has a function of adjusting an impedance of an output driver (not illustrated) provided inside and transmits data to the controller through the input/output pads IOx<7:0> and the data lines DQ0 to DQ7.

1.2.1 Configuration of ID_GF_SEL

Next, the circuit configuration of the ID_GF_SEL 302 will be described with reference to FIG. 3. The example of FIG. 3 is a circuit diagram focusing on the output data line IDGF_DATA_B0<0> of the output data buses IDGF_DATA_B0<7:0> in the ID_GF_SEL 302, and the other output data lines also have the same configuration. Therefore, the ID_GF_SEL 302 includes as many circuits as the number of the output data lines, that is, 32 circuits.

As illustrated, the ID_GF_SEL 302 receives the GF data from the data line GF_DATA_A0<0>, receives the ID data from the data lines ID_DATA_A0<0> and ID_DATA_A4<0>, and outputs one of these types of data to the data line IDGF_DATA_B0<0>.

The ID_GF_SEL 302 includes three-state inverters 101 and 102, inverters 103, 107, and 108, and NAND gates 104 to 106.

The three-state inverter 101 is controlled an on state and an off state by the inverted signal of the data select signal ID_SND, and inverts the ID data input from the data line ID_DATA_A0<0> at the time of the on state. The three-state inverter 102 is controlled an on state and an off state by the signal of the data select signal ID_SND, and inverts the ID data input from the data line ID_DATA_A4<0> at the time of the on state. Therefore, the three-state inverters 101 and 102 function as input signal changeover switches in response to the data select signal ID_SND. More specifically, in a case where the data select signal ID_SND is at an "L" level, the three-state inverter 101 becomes an on state and inverts the ID data input from the data line ID_DATA_A0<0>. On the other hand, the three-state inverter 102 becomes an off state (high impedance state). In addition, in a case where the data select signal ID_SND is at an "H" level, the three-state inverter 101 becomes an off state. On the other hand, the three-state inverter 102 becomes an on state and inverts the ID data input from the data line ID_DATA_A4<0>.

The inverter 103 inverts the data input from the three-state inverters 101 and 102 and outputs the inverted data to the data line ID_DATA_B0<0>.

The NAND gate 104 performs a negative AND (NAND) operation on the ID data input from the data line ID_DATA_B0<0> and the ID data enable signal ID_EN.

The NAND gate 105 performs a NAND operation on the GF data input from the data line GF_DATA_A0<0> and the GF data enable signal GF_EN.

The NAND gate 106 performs a NAND operation on the operation result of the NAND gate 104 and the operation result of the NAND gate 105.

The inverter 107 inverts and outputs the operation result of the NAND gate 106, and the inverter 108 inverts the output of the inverter 107 and outputs the inverted output to the data line IDGF_DATA_B0<0>.

Next, the data input/output relationship in the ID_GF_SEL 302 will be described with reference to FIG. 4.

First, the GF data output will be described. As illustrated, upon the GF data output, the GF data enable signal GF_EN becomes an "H" level and the ID data enable signal ID_EN becomes an "L" level. The signals (GF data) of the input data buses GF_DATA_A0<7:0> to GF_DATA_A3<7:0> are transmitted to the output data buses IDGF_DATA_B0<7:0> to IDGF_DATA_B3<7:0>.

Next, the ID data output will be described. Upon the ID data output, the GF data enable signal GF_EN becomes an "L" level and the ID data enable signal ID_EN becomes an "H" level. Furthermore, in a case where the data select signal ID_SND is "L", the signals (ID data) of the input data buses ID_DATA_A0<7:0> to ID_DATA_A3<7:0> are transmitted to the output data buses IDGF_DATA_B0<7:0> to IDGF_DATA_B3<7:0>. In addition, in a case where the data select signal ID_SND is "H", the signals of the input data buses ID_DATA_A4<7:0> to ID_DATA_A7<7:0> are transmitted to the output data buses IDGF_DATA_B0<7:0> to IDGF_DATA_B3<7:0>. Therefore, when the data select signal ID_SND is switched from "L" to "H", the ID_GF_SEL 302 outputs the ID data of the data buses ID_DATA_A0<7:0> to ID_DATA_A4<7:0> twice.

1.2.2 Configuration of REG_ID_GF_MUX

Next, the circuit configuration of the REG_ID_GF_MUX 301 will be described with reference to FIG. 5. The example of FIG. 5 is a circuit diagram focusing on the output data line YRD_QP01<0> of the output data buses YRD_QP01<7:0> in the REG_ID_GF_MUX 301, and the other output data lines and the signal line for transmitting the clock signals also have the same configuration. Therefore, the REG_ID_GF_MUX 301 includes as many circuits as the number of the output data lines and the signal lines, that is, 34 circuits.

As illustrated, the REG_ID_GF_MUX 301 receives the memory data from the data line YIO_QP01<0>, receives the ID data and the GF data from the data line IDGF_DATA_B0<0>, and outputs one of these types of data to the data line YRD_QP01<0>. The same is also applied to the case of the clock signals. For example, in FIG. 5, the data line YIO_QP01<0> may be replaced with a signal line that transmits the clock signal PICLK_QP01_C, the data line IDGF_DATA_B0<0> may be replaced with a signal line that transmits the clock signal PICLK_IDGF, and the data line YRD_QP01<0> may be replaced with the clock signal PICLK<0>.

The REG_ID_GF_MUX 301 includes a NOR gate 111, inverters 112, 116, and 117, and NAND gates 113 to 115. The NOR gate 111 performs a negative OR (NOR) operation on the ID data enable signal ID_EN and the GF data enable signal GF_EN.

The inverter 112 inverts the operation result of the NOR gate 111.

The NAND gate 113 performs a NAND operation on the memory data input from the data line YIO_QP01<0> and the signal input from the NOR gate 111.

The NAND gate 114 performs a NAND operation on the data (ID data or GF data) input from the data line IDGF_DATA_B0<0> and the signal input from the inverter 112.

The NAND gate 115 performs a NAND operation on the operation result of the NAND gate 113 and the operation result of the NAND gate 114.

The inverter 116 inverts and outputs the operation result of the NAND gate 106, and the inverter 117 inverts the output of the inverter 116 and outputs the inverted output to the data line YRD_QP01<0>.

Next, the data input/output relationship in the REG_ID_GF_MUX 301 will be described with reference to FIG. 6.

First, the memory data output will be described. As illustrated, upon the memory data output, both the ID data enable signal ID_EN and the GF data enable signal GF_EN become an "L" level. The signals (memory data) of the data buses YIO_QP01<15:0> are transmitted to the 16-bit output data buses YRD_QP01<15:0>. Similarly, the signals of the data buses YIO_QP23<15:0> are transmitted to the output data buses YRD_QP23<15:0>. In addition, the clock signal PICLK_QP01_C corresponding to the data buses YIO_QP01<15:0> is output as the clock signal PICLK<0>, and the clock signal PICLK_QP23_C corresponding to the data buses YIO_QP23<15:0> is output as the clock signal PICLK<1>.

Next, the ID data or GF data output will be described. Upon the ID data output, the ID data enable signal ID_EN becomes an "H" level, and upon the GF data output, the GF data enable signal GF_EN becomes an "H" level. Then, the signals (ID data or GF data) of the 8-bit input data buses IDGF_DATA_B0<7:0> are transmitted to the 8-bit output data buses YRD_QP01<7:0>. Similarly, the signals of the input data buses IDGF_DATA_B1<7:0> are transmitted to the 8-bit output data buses YRD_QP01<15:8>, the signals of the input data buses IDGF_DATA_B2<7:0> are transmitted to the output data buses YRD_QP23<7:0>, and the signals of the input data buses IDGF_DATA_B3<7:0> are transmitted to the output data buses YRD_QP23<15:8>. Then, the clock signal PICLK_IDGF is output as the clock signals PICLK<0> and PICLK<1>.

1.2.3 Configuration of MUX_CNTL

Next, the circuit configuration of the MUX_CNTL 321 will be described with reference to FIG. 7. The MUX_CNTL 321 includes eight circuits in correspondence to a pair of output data lines YRDox and YRDex.

As illustrated, the MUX_CNTL 321 includes three-state inverters 121 to 128 and inverters 129 to 132.

The three-state inverter 121 is controlled an on state and an off state by the signal C2P_E2O, and inverts the data input from the data line YRDFe at the time of the on state. The three-state inverter 122 is controlled an on state and an off state by the inverted signal of the signal C2P_E2O, and inverts the data input from the data line YRDFo at the time of the on state. Therefore, the three-state inverters 121 and 122 function as input signal changeover switches in response to the signal C2P_E2O. More specifically, in a case where the signal C2P_E2O is at an "H" level, the three-state inverter 121 becomes an on state, and in a case where the signal C2P_E2O is at an "L" level, the three-state inverter 122 becomes an on state.

The three-state inverter 123 is controlled an on state and an off state by the signal C2P_O2E, and inverts the data input from the data line YRDFo at the time of the on state. The three-state inverter 124 is controlled an on state and an off state by the inverted signal of the signal C2P_O2E, and inverts the data input from the data line YRDFe at the time of the on state. Therefore, the three-state inverters 123 and 124 function as input signal changeover switches in response to the signal C2P_O2E. More specifically, in a case where the signal C2P_O2E is at an "H" level, the three-state inverter 123 becomes an on state, and in a case where the signal C2P_O2E is at an "L" level, the three-state inverter 124 becomes an on state.

The three-state inverter 125 is controlled an on state and an off state by the inverted signal of the signal C2P_7X, and inverts the data input from the data line YRDFon at the time of the on state. The three-state inverter 126 is controlled an on state and an off state by the signal C2P_7X, and inverts dummy data input from a data line SIG_7X at the time of the on state. The data line SIG_7X is selected, for example, when the MUX_CNTL 321 does not output valid data. Therefore, the three-state inverters 125 and 126 function as first input signal changeover switches in response to the signal C2P_7X.

The three-state inverter 128 controls an on state and an off state by the inverted signal of the signal C2P_7X, and inverts the data input from the data line YRDFen at the time of the on state. The three-state inverter 127 controls an on state and an off state by the signal C2P_7X, and inverts dummy data input from a data line SIG_7X at the time of the on state. Therefore, the three-state inverters 127 and 128 function as second input signal changeover switches in response to the signal C2P_7X.

The inverter 129 inverts and outputs the data transmitted from the three-state inverters 125 and 126. The inverter 130 inverts the output of the inverter 129 and outputs the inverted output to the data line YRDox.

Similarly, the inverter 131 inverts and outputs the data transmitted from the three-state inverters 127 and 128. The inverter 132 inverts the output of the inverter 131 and outputs the inverted output to the data line YRDex.

Next, the data input/output relationship in the MUX_CNTL 321 will be described with reference to FIG. 8.

First, the memory data output will be described. As illustrated, upon the memory data output, all the signals C2P_E2O, C2P_O2E, and C2P_7X become an "L" level. Then, the signals (memory data) of the input data buses YRDFo<7:0> are transmitted to the output data buses YRDox<7:0>, and the signals of the input data buses YRDFe<7:0> are transmitted to the output data buses YRDex<7:0>.

Next, the ID data output will be described. First, in a case where the signal C2P_E2O is at an "H" level and the signal C2P_7X is at an "L" level, the signals (ID data) of the input data buses YRDFe<7:0> are transmitted to the output data buses YRDox<7:0>. In addition, in a case where the signal C2P_E2O is at an "L" level and the signal C2P_7X is at an "L" level, the signals of the input data buses YRDFo<7:0> are transmitted to the output data buses YRDox<7:0>. In the case of the ID read, the output data of the data bus YRDex is not used in the OUTREG 322.

Next, the GF data output will be described. First, in a case where the signal C2P_O2E is at an "L" level and the signal C2P_7X is at an "L" level, the signals (GF data) of the input data buses YRDFe<7:0> are transmitted to the output data buses YRDex<7:0>. In addition, in a case where the signal C2P_O2E is at an "H" level and the signal C2P_7X is at an "L" level, the signals of the input data buses YRDFo<7:0> are transmitted to the output data buses YRDex<7:0>. In the case of the GF read, the output data of the data bus YRDox is not used in the OUTREG 322.

1.2.4 Specific Example of Operation of MUX_CNTL

Figure 9:
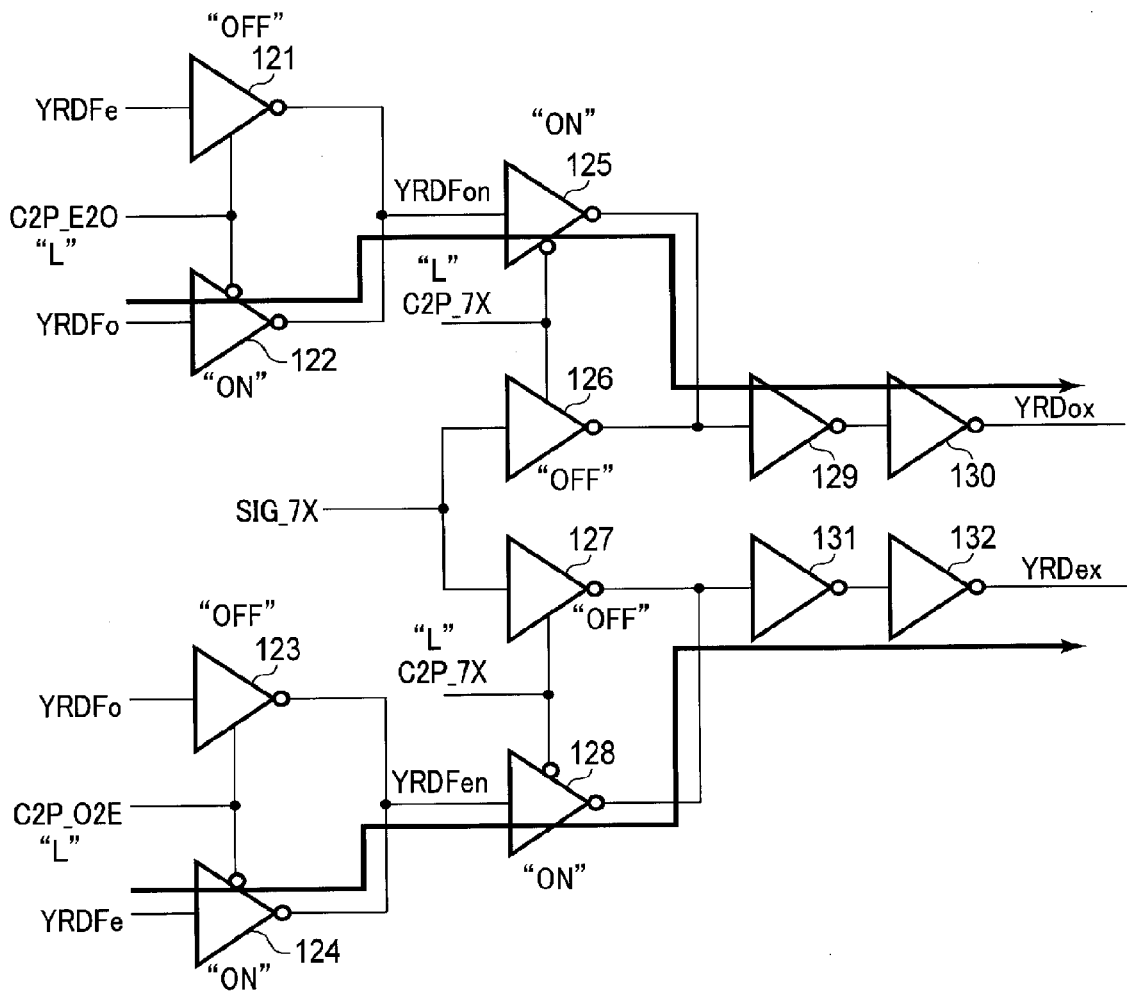
FIG. 9 is a circuit diagram upon memory data transmission of the multiplexer (MUX_CNTL) included in the semiconductor device according to the first embodiment.

Next, a specific example of the operation of the MUX_CNTL 321 in the data input and output will be described with reference to FIG. 9

As illustrated, in the case of transmitting the memory data, since all the signals C2P_E2O, C2P_O2E, and C2P_7X become an "L" level, the three-state inverters 122, 124, 125, and 128 become an on state. Therefore, the data input from the data line YRDFo is output to the data line YRDox through the three-state inverters 122 and 125, and the data input from the data line YRDFe is output to the data line YRDex through the three-state inverters 124 and 128.

Next, the case of transmitting the ID data will be described with reference to FIG. 10.

As illustrated, in the case of transmitting the ID data, the signal C2P_E2O becomes the clock signal, in the case of the "H" level, the three-state inverter 121 becomes an on state, and in the case of the "L" level, the three-state inverter 122 becomes an on state. Therefore, after the 2-bit data input from the data lines YRDFe and YRDFo are inverted, the 2-bit data are converted into serial data and are transmitted to the data line YRDFon. Then, since the signal C2P_7X becomes an "L" level, the three-state inverter 125 becomes an on state and the inverted serial data is inverted and transmitted to the data line YRDox. In the case of the ID read, since the data output to the data line YRDex is invalid data, the signal C2P_O2E is not particularly specified.

Figure 11:
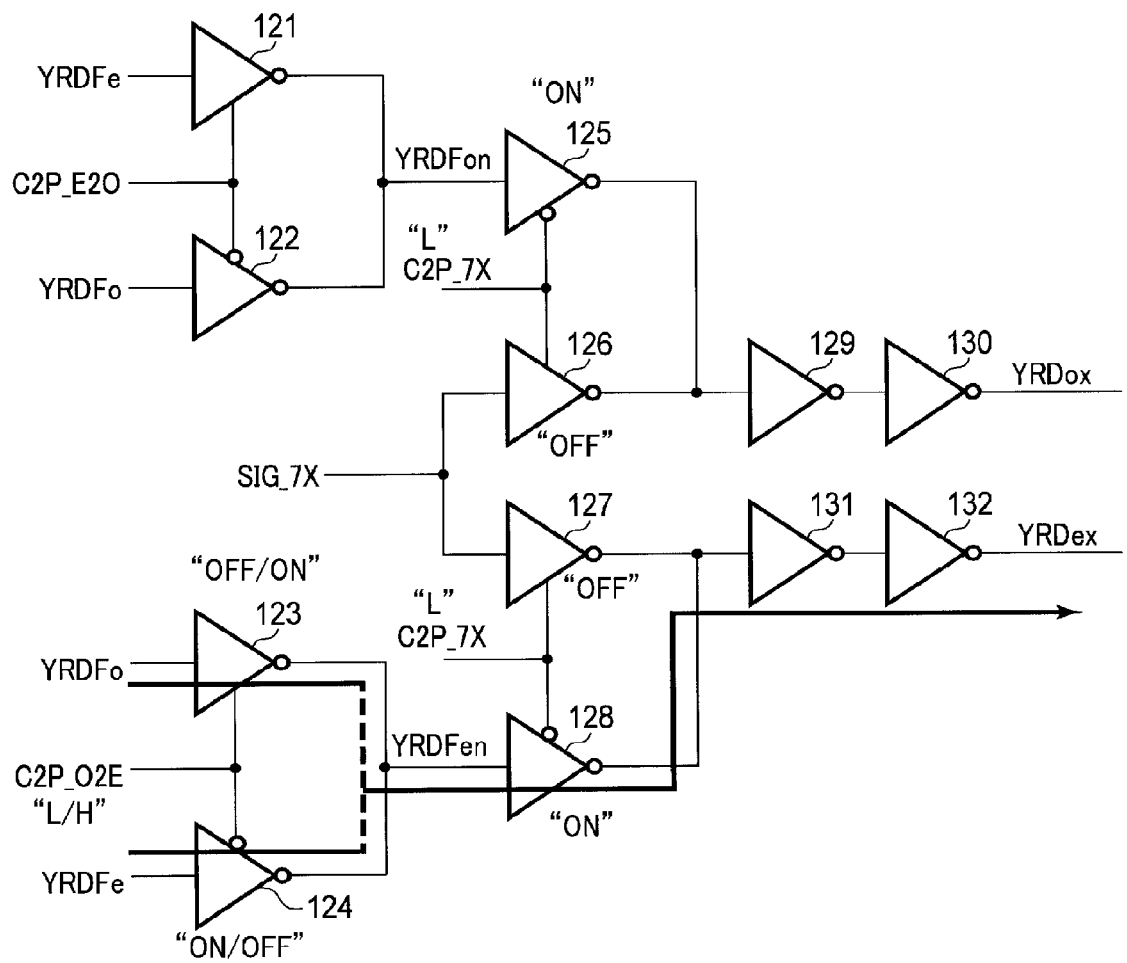
FIG. 11 is a circuit diagram upon GF data transmission of the multiplexer (MUX_CNTL) included in the semiconductor device according to the first embodiment.

Next, the case of transmitting the GF data will be described with reference to FIG. 11.

As illustrated, in the case of transmitting the GF data, the signal C2P_O2E becomes the clock signal, in the case of the "L" level, the three-state inverter 124 becomes an on state, and in the case of the "H" level, the three-state inverter 123 becomes an on state. Therefore, after the 2-bit data transmitted from the data lines YRDFe and YRDFo are inverted, the 2-bit data are converted into serial data and are transmitted to the data line YRDFen. Then, since the signal C2P_7X becomes an "L" level, the three-state inverter 128 becomes an on state and the inverted serial data is inverted and transmitted to the data line YRDex. In the case of the Get Feature, since the data output to the data line YRDox is invalid data, the signal C2P_E2O is not particularly specified.

1.3 Read Operation

Next, the signal transmission and reception between the controller and the NAND flash memory 1 and the data output of the I/O control circuit 10, upon the register read, the ID read, and the Get Feature, will be described in detail.

1.3.1 Register Read

Figure 12:
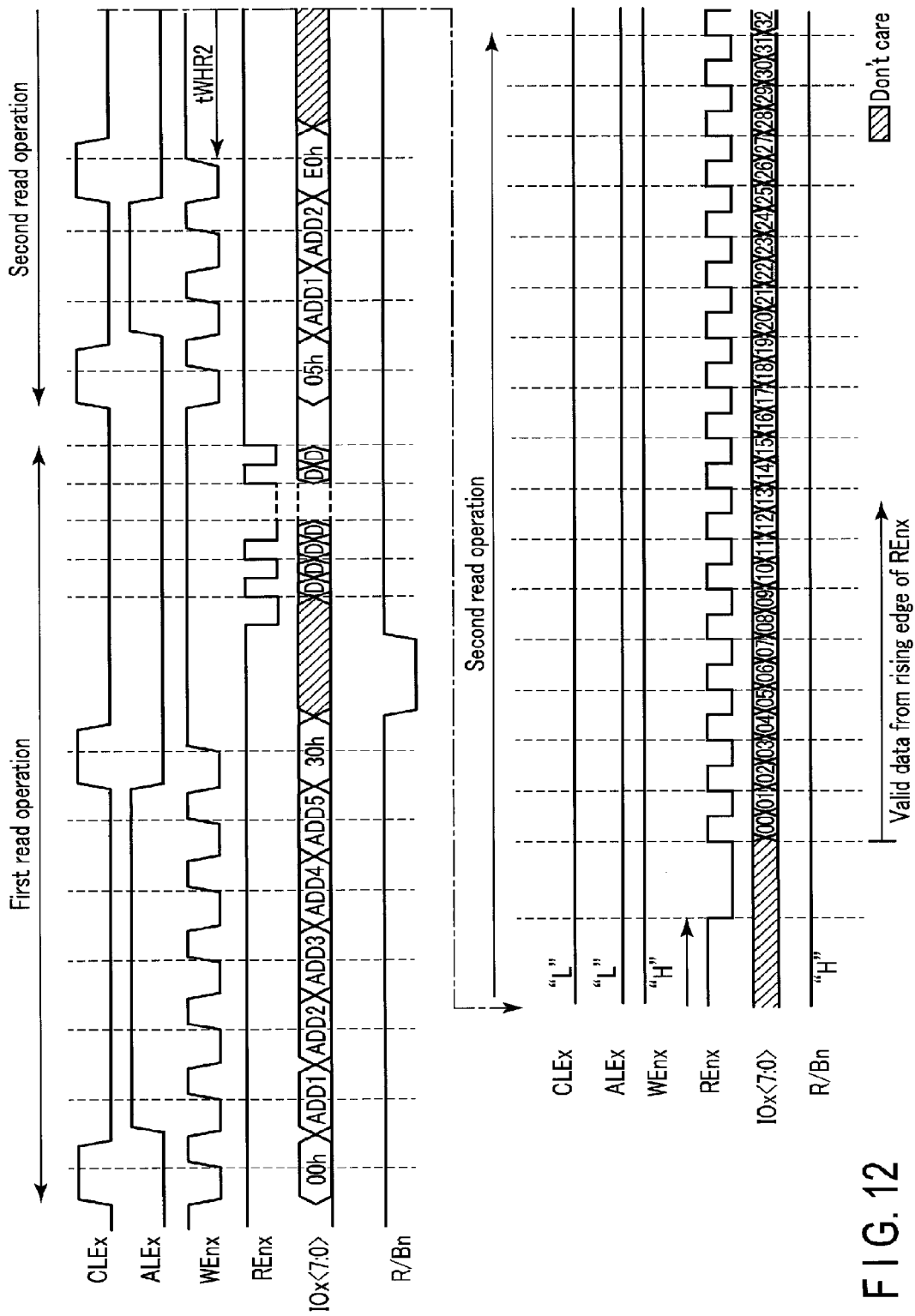
FIG. 12 is a command sequence upon register read in the semiconductor device according to the first embodiment.

First, the signals transmitted and received between the controller and the NAND flash memory 1 upon the register read will be described. In the following, the case of continuously reading memory data from two regions having different column addresses in the same page (same row address) will be described with reference to FIG. 12. More specifically, in the first read operation, the memory data of the page designated by the row address is stored to the data register 21, and then, the memory data of the designated column address is output from the data register 21. Then, in the second read operation, the reading of the memory data from the memory cell array 18 is not performed, and the memory data of the designated column address is output in the memory data held by the data register 21. Hereinafter, in the register read, in particular, the case of including the operation of reading the memory data from the memory cell array 18 to the data register 21 is referred to as "page read". Therefore, the first read operation is subjected to the page read, and the second read operation is subjected to the register read.

As illustrated, first, in the first read operation (page read), the controller issues a command "00h" that notifies the execution of the page read and asserts CLEx ("H" level).

Next, the controller issues address data "ADD1" to "ADD5" and asserts ALEx ("H" level). For example, the address data "ADD1" and "ADD2" are address data of column addresses, and the address data "ADD3" to "ADD5" are address data of row addresses. The address data are set as data of five cycles, but the number of the cycles is not particularly limited as long as there are cycles necessary for transmitting information related to the column addresses and the row addresses.

Next, the controller issues a page read command "30h" and asserts CLEx.

These commands and addresses are respectively stored in the command register 14 and the address register 13 of the NAND flash memory 1 whenever WEnx is toggled.

In response to the command "30h", the NAND flash memory 1 starts the page read and becomes a busy state (R/Bn="L").

When the NAND flash memory 1 completes the read operation, R/Bn returns to the "H" level.

The controller issues REnx in response to the situation that the NAND flash memory 1 becomes the ready state. The NAND flash memory 1 outputs data at a DDR whenever the REnx is toggled. That is, the data is output at twice the period corresponding to the rising and falling of REnx.

Next, only a difference of the second read operation (register read) from the page read will be described.

In the register read, the controller issues a command "05h" notifying that the register read is performed by changing the column address, and asserts CLEx.

Next, the controller issues address data "ADD1" and "ADD2" of the changed column address and asserts ALEx.

Next, the controller issues a register read command "E0h" and asserts CLEx. In response to the command "E0h", the NAND flash memory 1 starts the register read.

In the register read, the NAND flash memory 1 does not receive the control signal, including REnx, during a preset period. Alternatively, the controller may be additionally limited such that the controller does not spontaneously issue the control signal during the period. Hereinafter, the preset period, that is, the minimum waiting time until the NAND flash memory 1 receives the command "E0h" and the falling of REnx from an "H" level to an "L" level is possible from the rising of WEnx from an "L" level to an "H" level, is referred to as "tWHR2".

Next, when the read operation is completed, the NAND flash memory 1 outputs DDR data as in the data output of the first read operation. In the case of the page read and the register read, data is valid from the first rising edge of REnx.

Figure 13B:
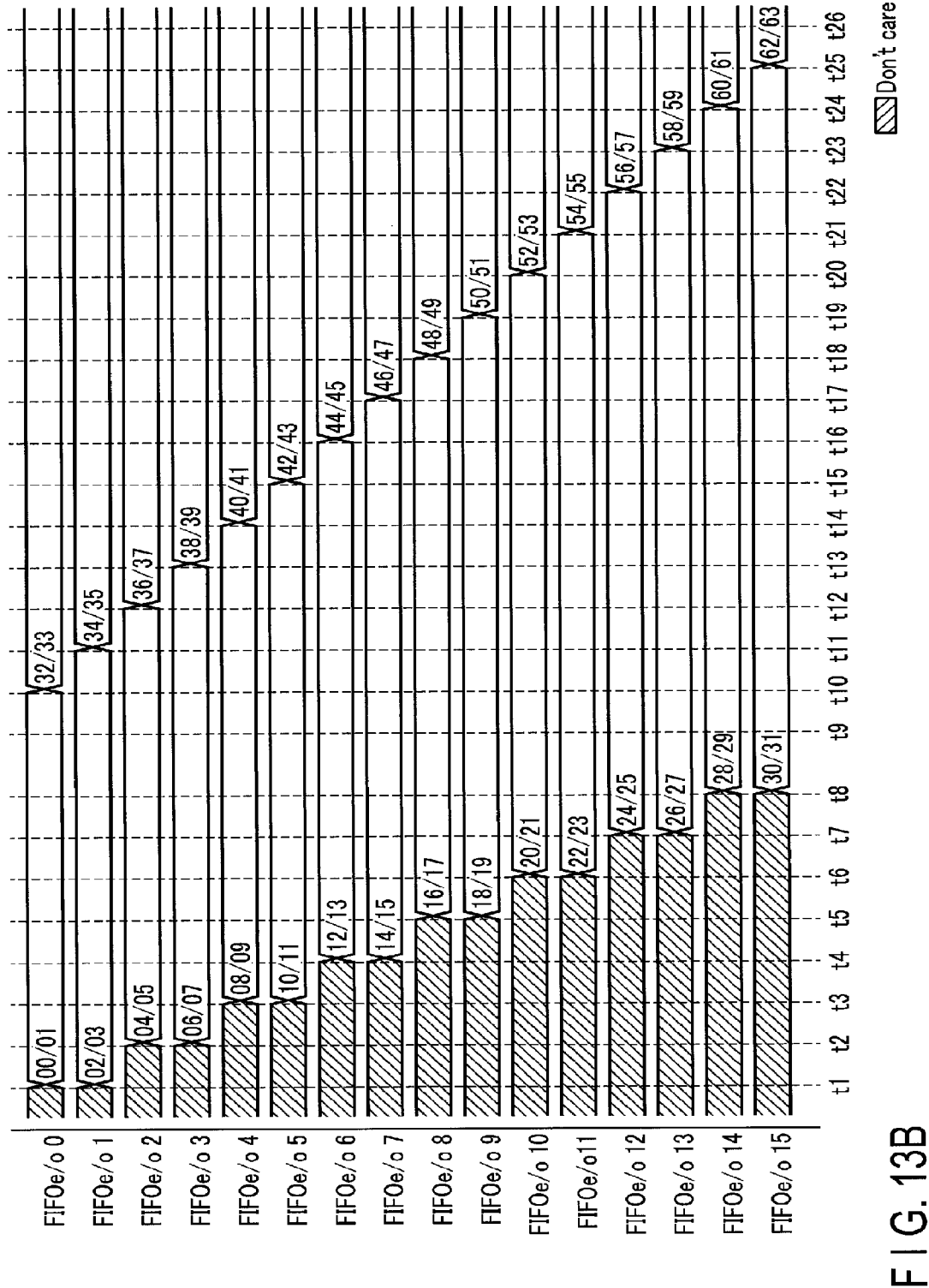
Figure 13C:
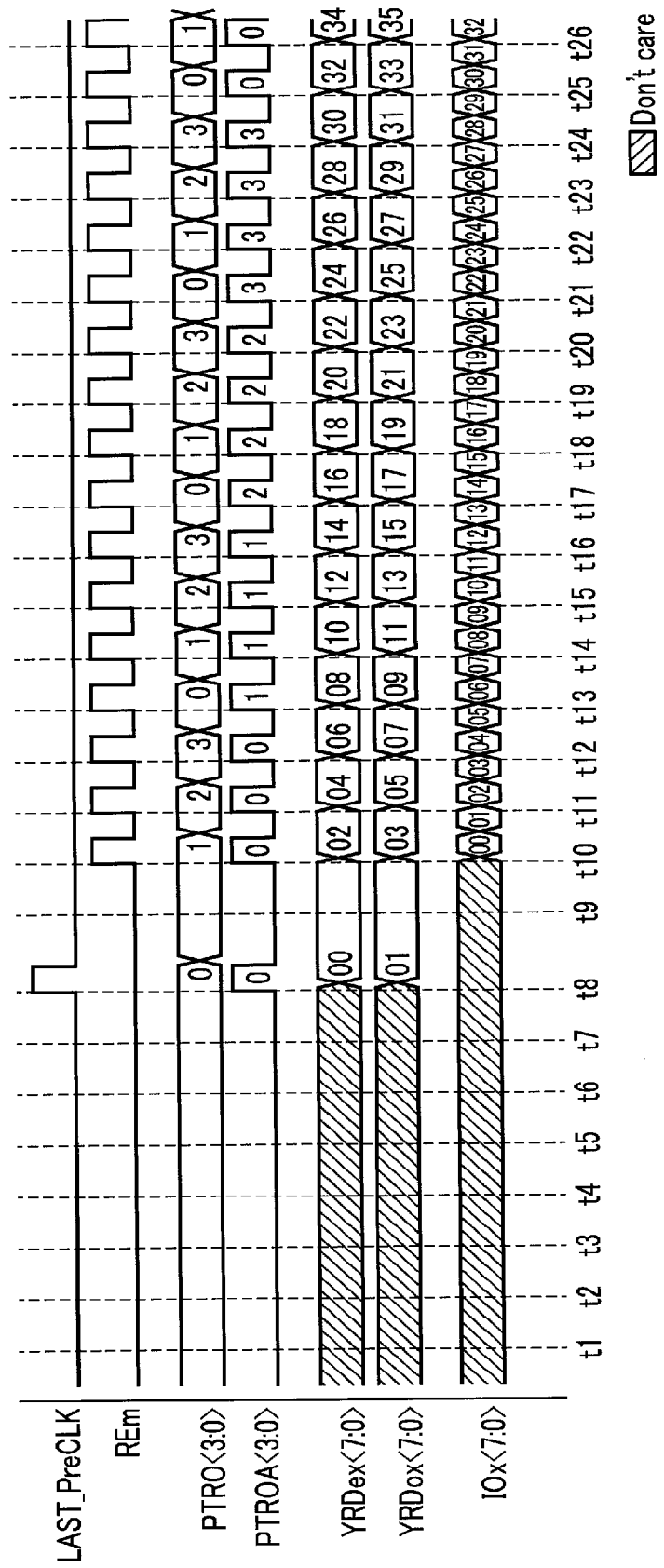

Next, the data output in the register read will be described in detail with reference to FIGS. 13A, 13B, and 13C. FIGS. 13A to 13C are timing charts in the same time axis of times t1 to t26 and show different signals. The examples of FIGS. 13A to 13C describe the case where the FIFO 304 includes 16 registers FIFOe/o (FIFOe/o 0 to FIFOe/o 15), each of which holds 2-byte data, that is, the case where 32-byte data are held in 16 registers. The 32-byte data held in each register FIFOe/o are referred to as data 00 to 31. Each of the data 00 to 31 has a data size of 1 byte.

As illustrated, first, at time t1 to time t8, the REG_ID_GF_MUX 301 sequentially outputs data 00/01, 04/05, 08/09, 12/13, 16/17, 20/21, 24/25, and 28/29 from the data buses YRD_QP01<15:0> according to the cycle of PICLK<0>. Similarly, at time t1 to time t8, the REG_ID_GF_MUX 301 sequentially outputs data 02/03, 06/07, 10/11, 14/15, 18/19, 22/23, 26/27, and 30/31 from the data buses YRD_QP23<15:0> according to the cycle of PICLK<1>.

The FIFO_CNTL 305 transmits, to the FIFO 304, the signals PTRI0e/on<7:0> and the signals PTRI1e/on<7:0> corresponding to the input address. The signals PTRI0e/on<7:0> are signals that are controlled by the clock signal PICLK<0>, and the signals PTRI1e/on<7:0> are signals that are controlled by the clock signal PICLK<1>. When the signals PTRI0e/on<7:0> and the signals PTRI1e/on<7:0> become an "L" level, the register FIFOe/o corresponding to the count fetches data. More specifically, the counts "0" to "7" of the signals PTRI0e/on<7:0> of FIG. 13A indicate that the respective signals PTRI0e/on<0> to PTRI0e/on<7> are enabled. For example, the count "0" indicates that the signal PTRI0e/on<0> is at an "L" level (enabled) and the signals PTRI0e/on<7:1> are at an "H" level (disabled). Since the signal PTRI0e/on<0> becomes an "L" level, the data is fetched into the register FIFOe/o 0 corresponding to the signal PTRI0e/on<0>. The count "0" of the signal PTRI0e/on<7:0> corresponds to the register FIFOe/o 0. In addition, the count "1" corresponds to the register FIFOe/o 2. The count "2" corresponds to the register FIFOe/o 4. The count "3" corresponds to the register FIFOe/o 6. The count "4" corresponds to the register FIFOe/o 8. The count "5" corresponds to the register FIFOe/o 10. The count "6" corresponds to the register FIFOe/o 12. The count "7" corresponds to the register FIFOe/o 14.

Similarly, the counts "0" to "7" of the signals PTRI1e/on<7:0> indicate that the respective signals PTRI1e/on<0> to PTRI1e/on<7> are enabled. The count "0" of the signal PTRI1e/on<7:0> corresponds to the register FIFOe/o 1. In addition, the count "1" corresponds to the register FIFOe/o 3. The count "2" corresponds to the register FIFOe/o 5. The count "3" corresponds to the register FIFOe/o 7. The count "4" corresponds to the register FIFOe/o 9. The count "5" corresponds to the register FIFOe/o 11. The count "6" corresponds to the register FIFOe/o 13. The count "7" corresponds to the register FIFOe/o 15.

In addition, the FIFO_CNTL 305 includes counters corresponding to the signals PTRI0e/on<7:0> and counters corresponding to the signals PTRI1e/on<7:0>, each of which counts from 0 to 7. The counter is reset, for example, when the register read command or the address data is received from the controller. The number of the counts is arbitrarily set according to the number of registers to be used.

At times t1 to t8, the FIFO 304 sequentially fetches data 00 to data 32 into the registers FIFOe/o 0 to FIFOe/o 15 in response to the signals PTRI0e/on<7:0> and the signals PTRI1e/on<7:0>. In the example of FIGS. 13A to 13C, 4-byte data are fetched at the same time. More specifically, at time t1, since the signals PTRI0e/on<7:0> and the signals PTRI1e/on<7:0> indicate the count "0" at the same time, the fetching of the data 00 and the data 01 into the register FIFOe/o 0 and the fetching of the data 02 and the data 03 into the register FIFOe/o 1 are performed at the same time.

Next, at time t8, when the signals PTRI0e/on<7:0> and the signals PTRI1e/on<7:0> are counted up to 7, the FIFO_CNTL 305 sets a signal LAST_PreCLK to be transmitted to the FIFO 304 to an "H" level. The signal LAST_PreCLK is a signal for outputting data to the OUTREG 322 within the period tWHR2.

In addition, the FIFO_CNTL 305 transmits the signals PTRO<3:0> and the signals PTROA<3:0> to the FIFO 304. The signals PTRO<3:0> and the signals PTROA<3:0> correspond to the output address when the FIFO 304 outputs data. More specifically, the FIFO_CNTL 305 includes counters corresponding to the signals PTRO<3:0> and counters corresponding to the signals PTROA<3:0>. These counters are reset, for example, when the register read command or the address data is received from the controller. The counters corresponding to the signals PTRO<3:0> repeat the count-up from "0" to "3" at the timing of the falling of the signal LAST_PreCLK and the falling of the clock signal REm. Specifically, the count "0" corresponds to the signal PTRO<0>, the count "1" corresponds to the signal PTRO<1>, the count "2" corresponds to the signal PTRO<2>, and the count "3" corresponds to the signal PTRO<3>.

In addition, the signals PTROA<3:0> are controlled by the signals LAST_PreCLK and REn, and all the signals PTROA<3:0> become a state of an "L" level (disabled) or only 1 bit among 4 bites becomes a state of an "H" level (enabled). For example, the count "0" of the signals PTROA<3:0> of FIG. 13C indicates that the signal PTROA<0> is "H" and the signals PTROA<3:1> are at an "L" level. The counters corresponding to the signals PTROA<3:0> count up once every four cycles. More specifically, when the count of the signals PTRO<3:0> is changed from "3" to "0", the signal PTROA<3:0> counts up by one and counts from "0" to "3". The count "0" corresponds to the signal PTROA<0>, the count "1" corresponds to the signal PTROA<1>, the count "2" corresponds to the signal PTROA<2>, and the count "3" corresponds to the signal PTROA<3>. The register FIFOe/o that outputs data is determined according to two pieces of the count information. For example, at time t8, [PTRO:PTROA=0:0] corresponds to the register FIFOe/o 0; at time t10, [PTRO:PTROA=1:0] corresponds to the register FIFOe/o 1; at time t13, [PTRO:PTROA=0:1] corresponds to the register FIFOe/o 4; and at time t24, [PTRO:PTROA=3:3] corresponds to the register FIFOe/o 15.

At time t8, when the signal LAST_PreCLK becomes an "H" level, the FIFO 304 outputs even data 00 of the register FIFOe 0 to the data buses YRDex<7:0> and outputs odd data 01 of the register FIFOo 0 to the data buses YRDox<7:0>, in response to the signals PTRO<3:0> and the signals PTROA<3:0>.

In the register read, the operations up to the above are ended during the period tWHR2. In the case of the page read, instead of providing the period tWHR2, the above operation may occur in the period where R/Bn is at an "L" level.

Subsequently, operations after the period tWHR2 (after time t9) will be described.

First, the OUTREG 322 triggers the input of the read enable signal REnx from an "H" level to an "L" level after the period tWHR2 and fetches the data 00 and the data 01 from the data buses YRDex<7:0> and YRDox<7:0>.

Subsequently, after time t10, the FIFO 304 outputs the data 02 to 31 held by the remaining registers FIFOe/o 1 to FIFOe/o 15 to the data buses YRDex<7:0> in the case of the even data and sequentially outputs the data 02 to 31 to the data buses YRDox<7:0> in the case of the odd data, at the rising timing of the clock signal REn input from the FIFO_CNTL 305, that is, the rising timing of the signals PTRO<3:0>. Therefore, the FIFO 304 outputs the memory data in response to the signal LAST_PreCLK during the period tWHR2, and outputs the memory data in response to the clock signal REn, that is, the read enable signal REnx, after the period tWHR2.

In addition, after time t10, the FIFO 304 sequentially fetches next data from the register FIFOe/o 0 in which the data output has been completed. Specifically, at time t10, since the clock signal PICLK<0> becomes an "H" level and the count of the signals PTRI0e/on<7:0> indicates "0", the FIFO 304 fetches the data 32 and the data 33 into the register FIFOe/o 0. Then, at time t11, since the clock signal PICLK<1> becomes an "H" level and the count of the signals PTRI1e/on<7:0> indicates "0", the FIFO 304 fetches the data 34 and the data 35 into the register FIFOe/o 1 that has output the data at time t10. Therefore, after time t10, the clock signals PICLK<0> and PICLK<1> alternately become an "H" level in correspondence to the data output (clock signal REn), and the counts corresponding to the signals PTRI0e/on<7:0> and the signals PTRI1e/on<7:0> count up by one.

The OUTREG 322 converts 16-bit data of the data buses YRDox<7:0> and YRDex<7:0> into 8-bit data in response to the clock signals REOLATe_rep and REOLATo_rep, and outputs the data from the input/output pads IOx<7:0> to the controller. More specifically, the OUTREG 322 outputs even data of the data buses YRDex<7:0> at the rising of the clock signal REOLATe_rep that has the same phase as, for example, the read enable signal REnx, and outputs odd data of the data buses YRDox<7:0> at the rising of the clock signal REOLATo_rep that has an opposite phase to the read enable signal REnx. Therefore, the OUTREG 322 outputs data at a DDR with respect to the read enable signal REnx.

1.3.2 ID Read

Figure 14:
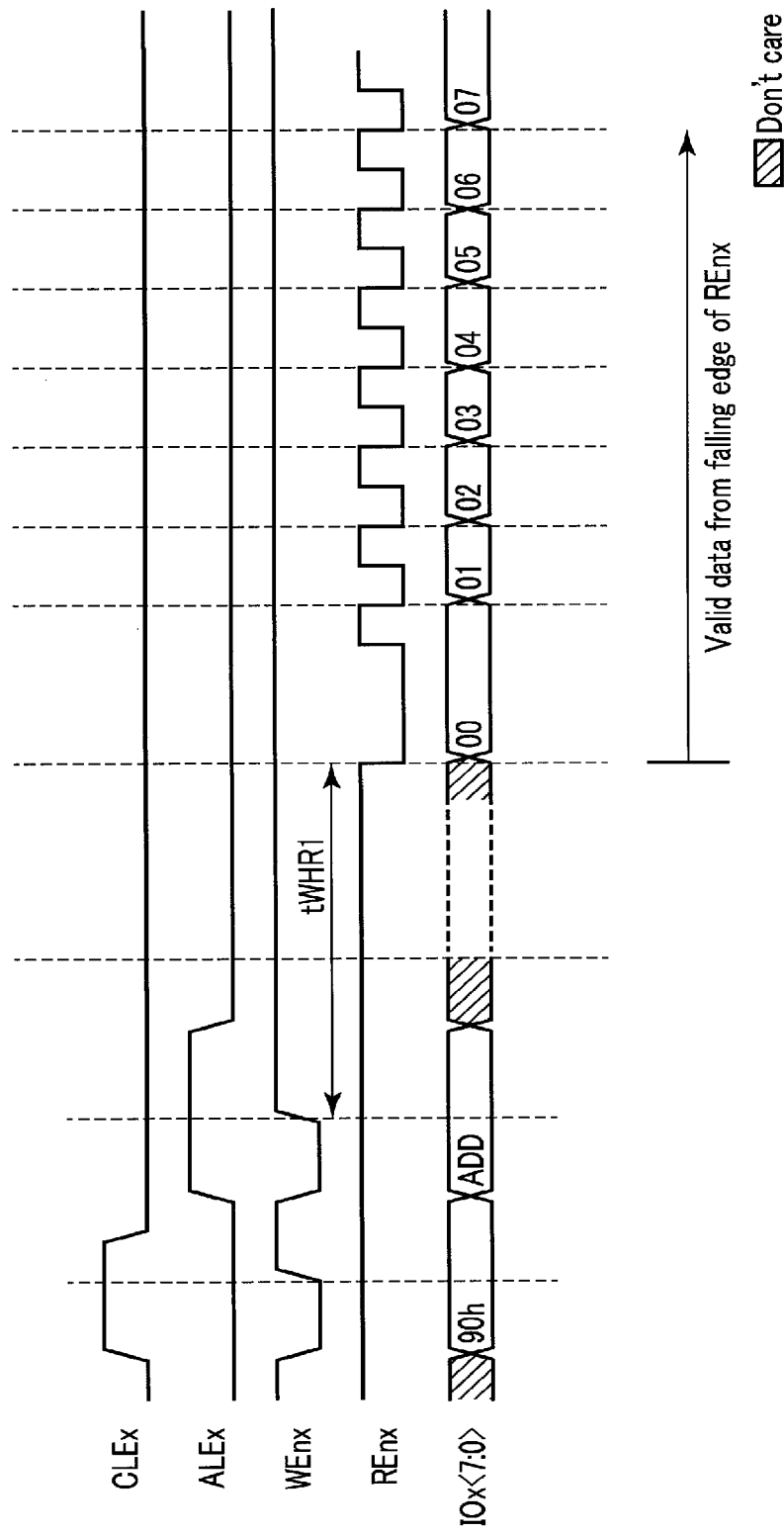
FIG. 14 is a command sequence upon ID read in the semiconductor device according to the first embodiment.

First, the signals transmitted and received between the controller and the NAND flash memory 1 upon the ID read will be described with reference to FIG. 14. In the following, only a difference from the register read will be described.

As illustrated, first, the controller issues an ID read command "90h".

Next, when the controller issues address data "ADD", the NAND flash memory 1 starts the ID read. The controller sets REnx to an "H" level during a preset period. Hereinafter, the minimum waiting time until the NAND flash memory 1 receives the address "ADD" and the falling of REnx from an "H" level to an "L" level is possible from the rising of WEnx from an "L" level to an "H" level, is referred to as "tWHR1".

After the period tWHR1, the NAND flash memory 1 outputs data at the timing at which the read enable signal REnx falls. In the case of the ID read, data is valid from the first falling edge of the read enable signal REnx.

Figure 15B:
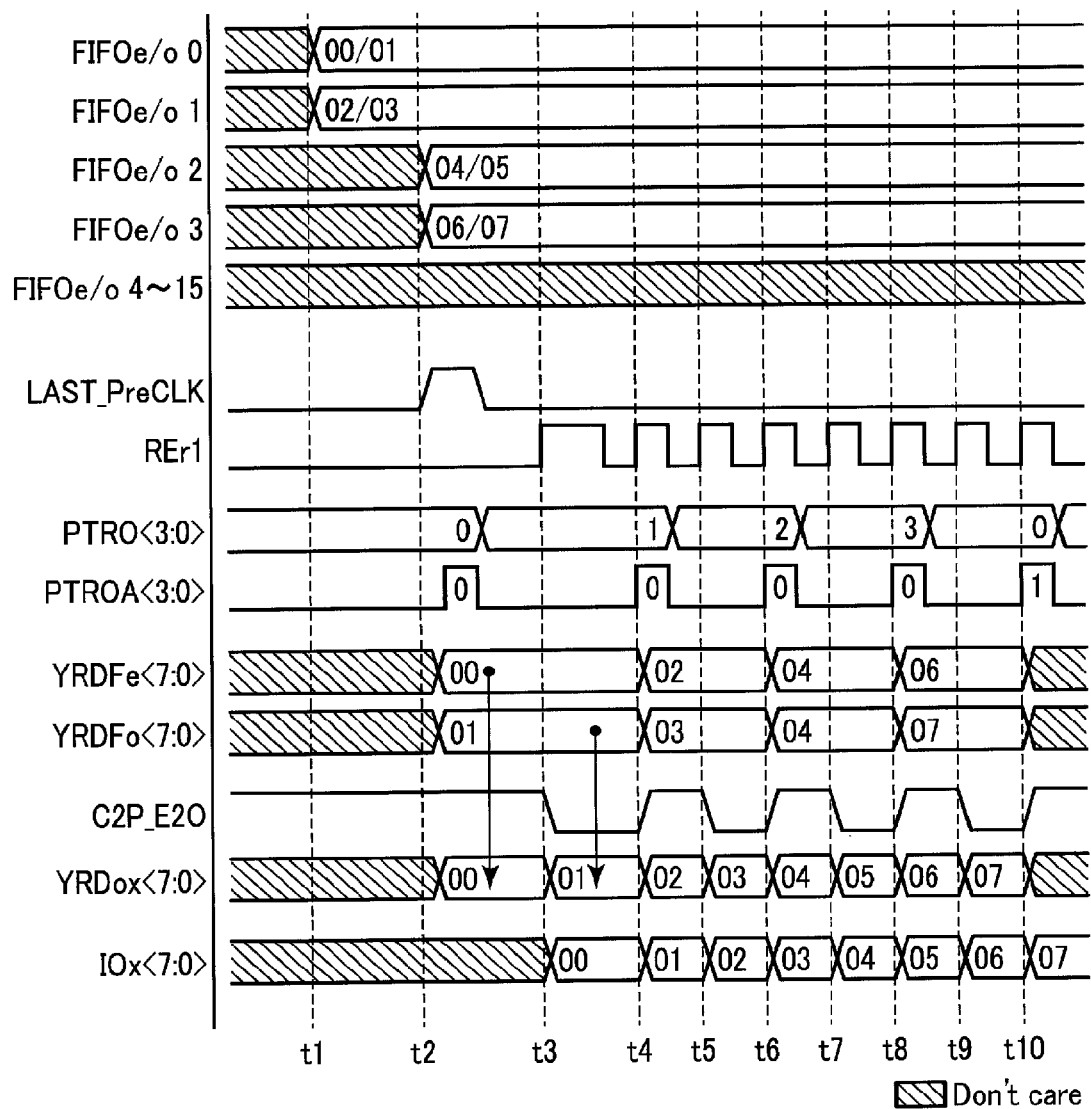

Next, the data output in the ID read will be described in detail with reference to FIGS. 15A and 15B. FIGS. 15A and 15B are timing charts in the same time axis of times t1 to t10 and show different signals. The example of FIGS. 15A and 15B describes the case of outputting 8-byte ID data.

As illustrated, first, when the ID read command or the address data is received from the controller, the OSC 303 sets the data select signal ID_SND to an "L" level. In addition, the OSC 303 transmits the clock signal PICLK_IDGF to the REG_ID_GF_MUX 301. Between time t1 and time t2, the OSC 303 switches the data select signal ID_SND (not illustrated) from an "H" level to an "L" level at the falling timing of the first cycle of the clock signal PICLK_IDGF, and transmits the data select signal ID_SND to the ID_GF_SEL 302.

Before time t1, the ID_GF_SEL 302 outputs 4-byte data 00 to 03 to the data buses IDGF_DATA_B0<7:0> to IDGF_DATA_B3<7:0>. Then, between time t1 and time t2, when the switching of the data select signal ID_SND from an "L" level to an "H" level is received, the ID_GF_SEL 302 outputs the remaining 4-byte data 04 to 07.

The REG_ID_GF_MUX 301 outputs the input clock signal PICLK_IDGF as PICLK<0> and PICLK<1>. In addition, before time t1, the REG_ID_GF_MUX 301 outputs the data 01 and 00 to the data buses YRD_QP01<15:0> and outputs the data 03 and 02 to the data buses YRD_QP23<15:0>. Similarly, the REG_ID_GF_MUX 301 also outputs the data 04 to 07 between time t1 and time t2.

When the ID read command or the address data is received from the controller, the FIFO_CNTL 305 resets the counters corresponding to the signals PTRI0e/on<7:0> and the signals PTRI1e/on<7:0>, the counters corresponding to the signals PTRO<3:0>, and the counters corresponding to the signals PTROA<3:0>. Then, the FIFO_CNTL 305 counts up the signals PTRI0e/on<7:0> and the signals PTRI1e/on<7:0> controlled by the clock signals PICLK<0> and PICLK<1> and transmits the count to the FIFO 304.

At time t1, the FIFO 304 fetches data 00/01 into the register FIFOe/o 0 in response to the clock signal PICLK<0> and the signal PTRI0e/on<7:0>. Similarly, the FIFO 304 fetches data 02/03 into the register FIFOe/o 1 in response to the clock signal PICLK<1> and the signal PTRI1e/on<7:0>. In addition, at time t2, the FIFO 304 fetches data 04/05 into the register FIFOe/o 2 and fetches data 06/07 into the register FIFOe/o 3. In the example of FIGS. 15A and 15B, since the ID data is 8 bytes, the registers FIFOe/o 4 to FIFOe/o 15 are not used.

Next, at time t2, the FIFO_CNTL 305 sets the signal LAST_PreCLK to an "H" level. In addition, the FIFO_CNTL 305 transmits, to the FIFO 304, the signal in which both the signals PTRO<3:0> and the signals PTROA<3:0> are the count "0".

When the signal LAST_PreCLK becomes an "H" level, the FIFO 304 outputs data 00 of the register FIFOe 0 to the data buses YRDFe<7:0> and outputs data 01 of the register FIFOo 0 to the data buses YRDFo<7:0>, in response to the signals PTRO<3:0> and the signals PTROA<3:0>.

Since the signal C2P_E2O becomes an "H" level in an initial state, the MUX_CNTL 321 outputs data 00 of the data buses YRDFe<7:0> to the data buses YRDox<7:0>.

The OUTREG 322 fetches the data 00 from the data buses YRDox<7:0>.

In the ID read, the operations up to the above are ended during the period tWHR1.

Subsequently, operations after the period tWHR1 (after time t3) will be described.

Subsequently, the FIFO_CNTL 305 sets the signals PTROA<3:0> to an "H" level at the rising timings of even cycles of the clock signal REr1 at times t4, t6, t8, and t10, and counts up the signals PTRO<3:0> at the falling timings. That is, the FIFO_CNTL 305 operates the counters of the signals PTRO<3:0> and the signals PTROA<3:0> at twice the period of the clock signal REr1. The FIFO_CNTL 305 includes, for example, a divider and may generate a signal of twice the period of the clock signal REr1 and count up the counter in response to the signal.

In response to the signals PTRO<3:0> and the signals PTROA<3:0>, the FIFO 304 outputs data 02 to 07 held in the remaining registers FIFOe/o 1 to FIFOe/o 3 to the data buses YRDFe<7:0> in the case of even data and outputs data 02 to 07 to the data buses YRDFo<7:0> in the case of odd data, at twice the period of the clock signal REr1. Therefore, the FIFO 304 outputs the ID data in response to the signal LAST_PreCLK during the period tWHR1, and outputs the ID data in response to the clock signal REr1, that is, the read enable signal REnx, after the period tWHR1.

At time t3, when the signal C2P_E2O is inverted to an "L" level at the first rising timing of the clock signal REr1, the MUX_CNTL 321 outputs data 01 of the data buses YRDFo<7:0> to the data buses YRDox<7:0>. After time t4, since the signal C2P_E2O is inverted according to the rising timings of the clock signal REr1, the MUX_CNTL 321 outputs data 02 to 07 to the data buses YRDox<7:0> by switching the input source to the data buses YRDFe<7:0> and YRDFo<7:0>.

The OUTREG 322 outputs input data from the data buses YRDox<7:0> to the input/output pads IOx<7:0>, according to the falling timing of the read enable signal REnx.

1.3.3 Get Feature

First, the signals transmitted and received between the controller and the NAND flash memory 1 upon the Get Feature will be described with reference to FIG. 16. In the following, only a difference from the register read and the ID read will be described.

As illustrated, first, the controller issues a Get Feature command "EEh".

Next, when the controller issues address data "ADD", the NAND flash memory 1 starts the Get Feature. The controller sets REnx to an "H" level during a preset period. Hereinafter, the minimum waiting time until the NAND flash memory 1 receives the address "ADD" and the falling of REnx from an "H" level to an "L" level is possible from the rising of WEnx from an "L" level to an "H" level, is referred to as "tFEAT".

After the period tFEAT, the NAND flash memory 1 outputs data at the timing at which REnx falls. In the case of the Get Feature, data is valid from the first rising edge of REnx.

Next, the data output in the Get Feature will be described in detail with reference to FIG. 17. The example of FIG. 17 describes the case of outputting 4-byte GF data.

As illustrated, the REG_ID_GF_MUX 301 outputs data 00 to 03 to the data buses YRD_QP01<15:0> and YRD_QP23<15:0>.

When the Get Feature command or the address data is received from the controller, the FIFO_CNTL 305 resets the counters corresponding to the signals PTRI0e/on<7:0> and the signals PTRI1e/on<7:0>, the counters corresponding to the signals PTRO<3:0>, and the counters corresponding to the signals PTROA<3:0>. Then, the FIFO_CNTL 305 transmits the signals PTRI0e/on<7:0> and the signals PTRI1e/on<7:0> controlled by the clock signals PICLK<0> and PICLK<1> to the FIFO 304.

At time t1, the FIFO 304 fetches data 00 to 03 into the registers FIFOe/o 0 and FIFOe/o 1. In the example of FIG. 17, since the GF data is 4 bytes, the registers FIFOe/o2 to FIFOe/o 15 are not used. At time t2, when the signal LAST_PreCLK becomes an "H" level, the FIFO 304 outputs data 00 of the register FIFOe/o 0 to the data buses YRDFe<7:0> and outputs data 01 to the data buses YRDFo<7:0>.

Since the signal C2P_O2E becomes an "L" level in an initial state, the MUX_CNTL 321 outputs data 00 of the data buses YRDFe<7:0> to the data buses YRDox<7:0>.

In the Get Feature, the operations up to the above are ended during the period tFEAT.

Subsequently, operations after the period tFEAT (after time t3) will be described.

First, the OUTREG 322 triggers the input of the read enable signal REnx from an "H" level to an "L" level after the period tFEAT and fetches the data 00 from the data buses YRDox<7:0>.

Subsequently, when the clock signal REm is input at time t3, the FIFO_CNTL 305 sets the signal PTROA<0> to an "H" level at the rising timing of the second cycle of the clock signal REm at times t5 and t7, and counts up the signals PTRO<3:0> at the falling timings.

The FIFO 304 outputs the data 02 and 03 held by the register FIFOe/o 1 to the data buses YRDFe<7:0> and the data buses YRDFo<7:0> in response to the signals PTRO<3:0> and the signal PTROA<3:0>. Therefore, the FIFO 304 outputs the GF data in response to the signal LAST_PreCLK, that is, the clock signal PICLK_IDGF, during the period tFEAT, and outputs the GF data in response to the clock signal RErn, that is, the read enable signal REnx, after the period tFEAT.

At time t4, when the signal C2P_O2E is inverted to an "H" level at the first rising timing of the clock signal RErn, the MUX_CNTL 321 outputs data 01 of the data buses YRDFo<7:0> to the data buses YRDex<7:0>. Subsequently, at times t5 to t7, the signal C2P_O2E is inverted at the rising timing of the clock signal RErn, and the MUX_CNTL 321 outputs data 02 and data 03 to the data buses YRDex<7:0>.

The OUTREG 322 outputs input data from the data buses YRDex<7:0> to the input/output pads IOx<7:0>, according to the rising timing of the read enable signal REnx at times t4 to t7.

1.4 Effects of Present Embodiment

The configuration according to the present embodiment can achieve the high-speed data output of the semiconductor device. The effects will be described below.

In the semiconductor device, the high-speed data input and output is in progress. For example, in the nonvolatile semiconductor memory such as the NAND flash memory, high-speed reading of the ID data or the GF data as well as the memory data is also in progress. However, generally, the rate of the number of readings of data to the number of the user s operations is largest in the register read and is small in the ID read and the Get Feature. Furthermore, since the data amount of the ID data and the GF data is smaller than the memory data, there is a case where the data output cycle in the ID read and the Get Feature is later than the register read.

Specifically, there is a case where the memory data is output at a DDR, whereas the ID data and the GF data are output at an SDR. In this case, generally, the output path of the memory data and the output path of the ID data and the GF data are separately designed. When the output paths are different, a variation occurs in the timing of the output data, even when the same clock signal is used, due to a difference in the circuit configuration of each output path or a difference in the influence on a process variation, a voltage drop, or the like. Furthermore, since the output paths are different, for example, in a case where the transmission distances of the clock signals are different, or in a case where the clock signals received by each output path are transmitted through different circuits, a clock variation occurs due to the output path receiving the same clock signal and a variation occurs in the timing of the output data. Therefore, in the final data fetch destination (output register) when outputting data to the outside, it is necessary to appropriately adjust a setup time and a hold time of the input data with respect to a plurality of output paths. Therefore, the output cycle is rate-limited by the margin adjustment, and it may be difficult to increase the speed.

In this regard, the configuration according to the present embodiment the memory data and the incidental data, that is, the ID data or the GF data can be integrated into one output path by the multiplexer REG_ID_GF_MUX 301. Therefore, the output data is timing-controlled in the FIFO 304 and is then transmitted to the OUTREG 322 that is the final data fetch destination. Therefore, since all data are timing-controlled in the FIFO 304, there is no difference in the circuit configuration of each output path or there is no problem such as the process variation, and a difference does not occur in the clock signals due to the difference in the transmission path, thereby suppressing the deviation in the timing of the output data. Therefore, it is possible to minimize the margin of the setup time and the hold time in the OUTREG 322, thereby increasing the speed of the output cycle.

Furthermore, in the configuration according to the present embodiment, since data is output from one output path and the difference in the clocks can be suppressed, the erroneous output of the data can be suppressed. Therefore, the reliability of the read data can be improved.

Moreover, in the configuration according to the present embodiment, the I/O control circuit 10 includes the OSC 303 and can provide the clock signal necessary when the FIFO 304 fetches the ID data or the GF data. Therefore, the FIFO 304 can perform the input and output of the ID data or the GF data in the ID read or the Get Feature during the period tWHR1 or the period tFEAT. Therefore, the OUTREG 322 can output data from the first falling or rising of the read enable signal REnx. Moreover, the OSC 303 can shorten the period tWHR1 or the period tFEAT by optimizing the frequency of the clock signal. Therefore, the read operation in the ID read or the Get Feature can be performed in a short time.

2. Second Embodiment

Next, a semiconductor device according to a second embodiment will be described. A difference from the first embodiment is that 64-bit data buses are connected to the REG_ID_GF_MUX 301. In the following, only a difference from the first embodiment will be described.

2.1 Configuration of I/O Control Circuit

Figure 18:
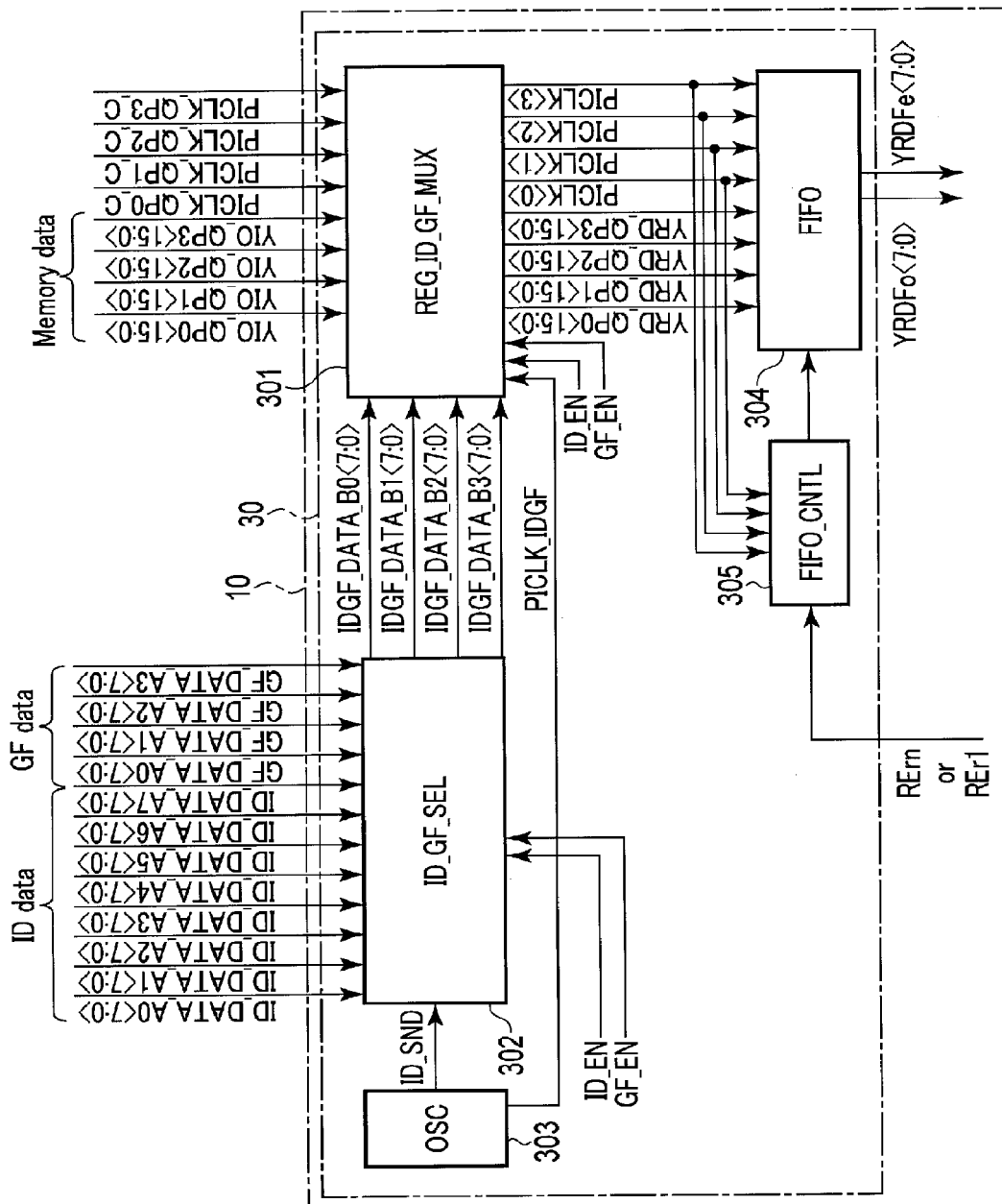
FIG. 18 is a block diagram of an output data control unit of an I/O control circuit included in a semiconductor device according to a second embodiment.

First, details of the configuration of the I/O control circuit 10 will be described with reference to FIG. 18, particularly focusing on the output data control unit 30.

As illustrated, the REG_ID_GF_MUX 301 according to the present embodiment receives memory data from the data register 21 through 64-bit data buses YIO_QP0<15:0> to YIO_QP3<15:0>. In addition, the REG_ID_GF_MUX 301 receives the clock signal PICLK_QP0_C corresponding to the data buses YIO_QP0<15:0>, the clock signal PICLK_QP1_C corresponding to the data buses YIO_QP1<15:0>, the clock signal PICLK_QP2_C corresponding to the data buses YIO_QP2<15:0>, and the clock signal PICLK_QP3_C corresponding to the data buses YIO_QP3<15:0>. Then, the REG_ID_GF_MUX 301 outputs one of the memory data, the ID data, or the GF data to the 64-bit data buses YRD_QP0<15:0> to YRD_QP3<15:0> and outputs the clock signals PICLK<0> to PICLK<3> corresponding thereto.

2.2 Configuration of MUX_CNTL

Next, the circuit configuration of the MUX_CNTL 321 will be described with reference to FIG. 19. A difference from FIG. 7 is that the signals C2P_E2O and C2P_O2E and the function of switching the corresponding input signals are removed. In the present embodiment, in the case of transmitting the ID data or the GF data, the same data is input from the data lines YRDFo and YRDFe, and thus, the operation of switching the input data is unnecessary.

Figure 19:
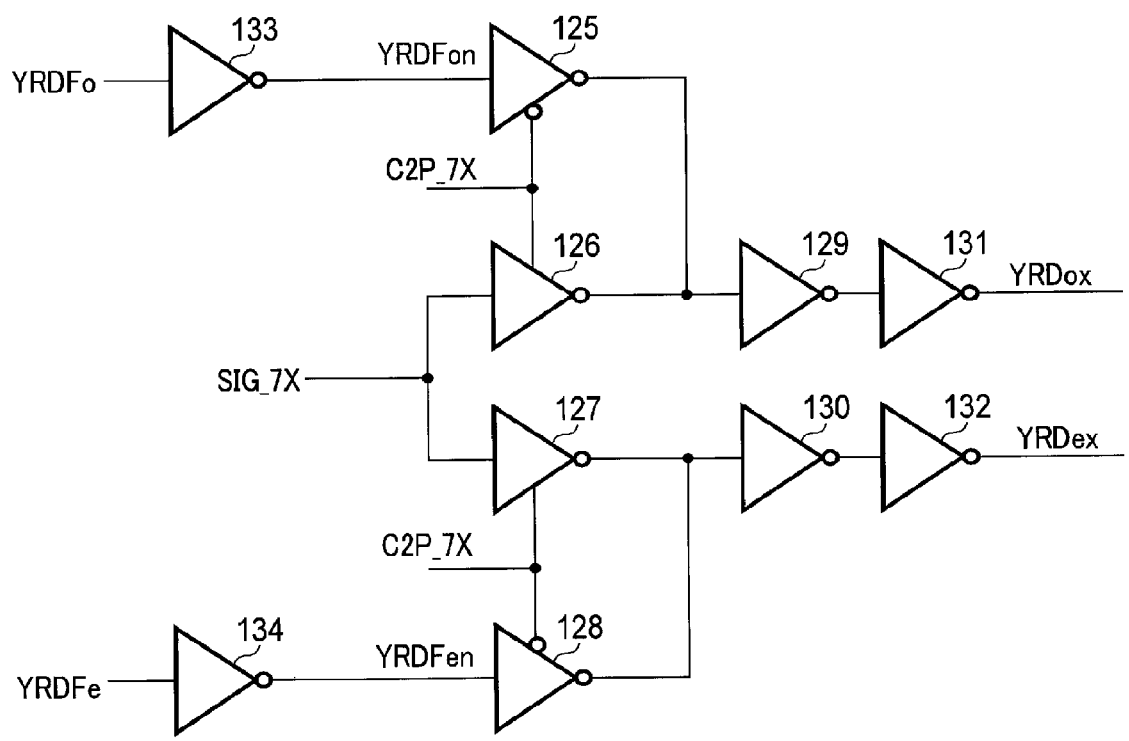
FIG. 19 is a circuit diagram of a multiplexer (MUX_CNTL) included in the semiconductor device according to the second embodiment.

That is, as illustrated in FIG. 19, the three-state inverters 121 to 124 are removed in FIG. 7 described in the first embodiment, and new inverters 133 and 134 are provided.

The inverter 133 inverts the signal input from the data line YRDFo. In addition, the inverter 134 inverts the data input from the data line YRDFe.

2.3 Data Output of REG_ID_GF_MUX

Next, the data input/output relationship in the REG_ID_GF_MUX 301 will be described with reference to FIG. 20.

First, the memory data output will be described. As illustrated, upon the memory data output, both the ID data enable signal ID_EN and the GF data enable signal GF_EN become an "L" level. The signals (memory data) of the 16-bit input data buses YIO_QP0<15:0> are output to the 16-bit output data buses YRD_QP0<15:0>. Similarly, the signals of the input data buses YIO_QP1<15:0> are output to the output data buses YRD_QP1<15:0>, the signals of the input data buses YIO_QP2<15:0> are output to the output data buses YRD_QP2<15:0>, and the signals of the input data buses YIO_QP3<15:0> are output to the output data buses YRD_QP3<15:0>. Then, the clock signal PICLK_QP0_C is output as the clock signal PICLK<0>. Similarly, the clock signal PICLK_QP1_C is output as the clock signal PICLK<1>, the clock signal PICLK_QP2_C is output as the clock signal PICLK<2>, and the clock signal PICLK_QP3_C is output as the clock signal PICLK<3>.

Next, the ID data or GF data output will be described. Upon the ID data output, the ID data enable signal ID_EN becomes an "H" level, and upon the GF data output, the GF data enable signal GF_EN becomes an "H" level. Then, the signals (ID data or GF data) of the 8-bit input data buses IDGF_DATA_B0<7:0> are output to the 8-bit output data buses YRD_QP0<7:0> and the 8-bit output data buses YRD_QP0<15:8>. That is, the signals output to the data buses YRD_QP0<7:0> and YRD_QP0<15:8> are the same as one another. Similarly, the signals of the 8-bit input data buses IDGF_DATA_B1<7:0> are output to the 8-bit output data buses YRD_QP1<7:0> and the 8-bit output data buses YRD_QP1<15:8>. The signals of the 8-bit input data buses IDGF_DATA_B2<7:0> are output to the 8-bit output data buses YRD_QP2<7:0> and the 8-bit output data buses YRD_QP2<15:8>. In addition, the signals of the 8-bit input data buses IDGF_DATA_B3<7:0> are output to the 8-bit output data buses YRD_QP3<7:0> and the 8-bit output data buses YRD_QP3<15:8>. Then, the clock signal PICLK_IDGF is output as the clock signals PICLK<0> to PICLK<4>.

2.4 Data Output of I/O Control Circuit

Next, the data output from the I/O control circuit 10 will be described. In the following, only a difference from the first embodiment will be described.

2.4.1 Register Read

Figure 21A:
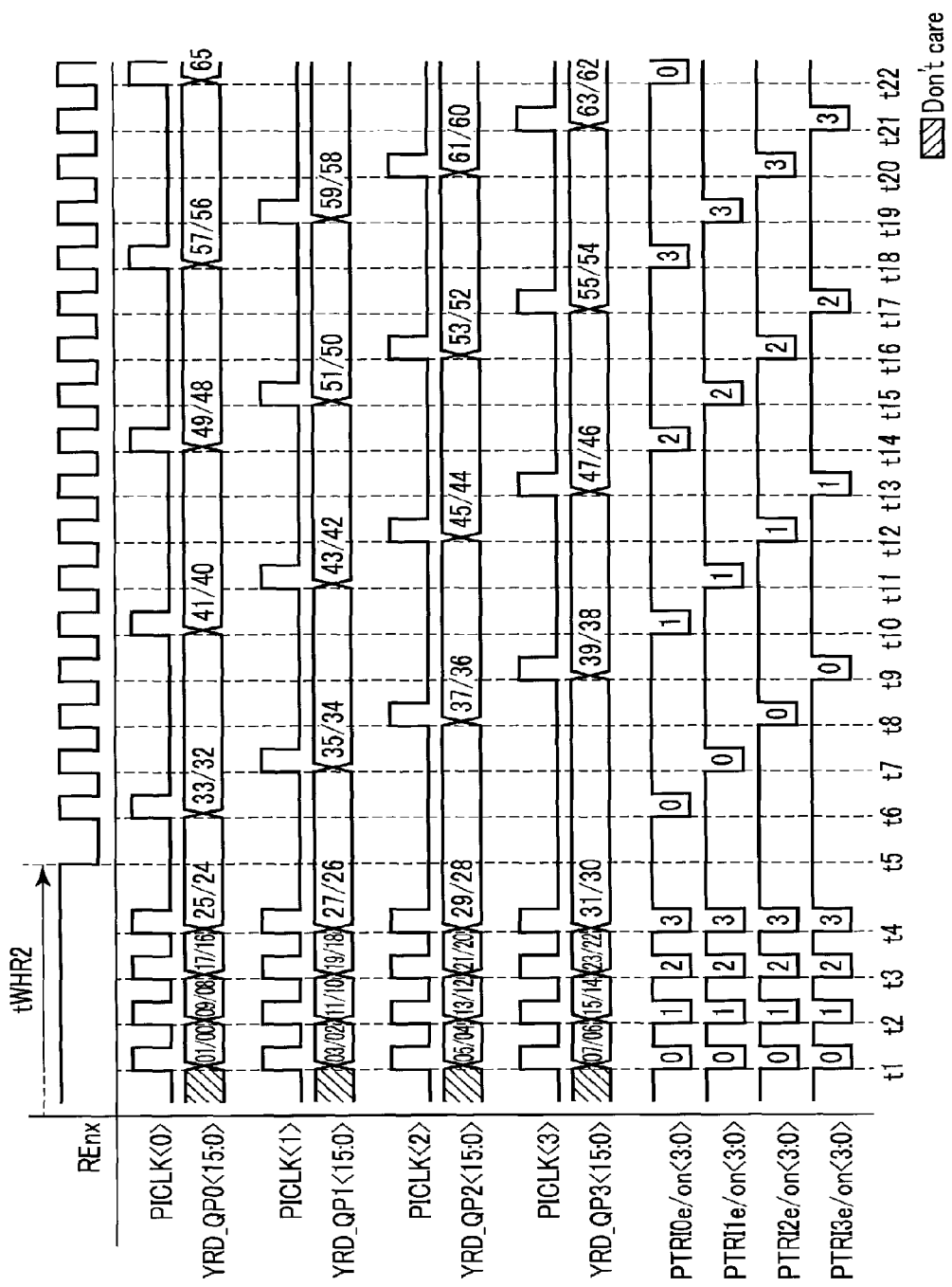
FIGS. 21A, 21B, and 21C are timing charts of data output upon register read in the I/O control circuit included in the semiconductor device according to the second embodiment.
Figure 21B:
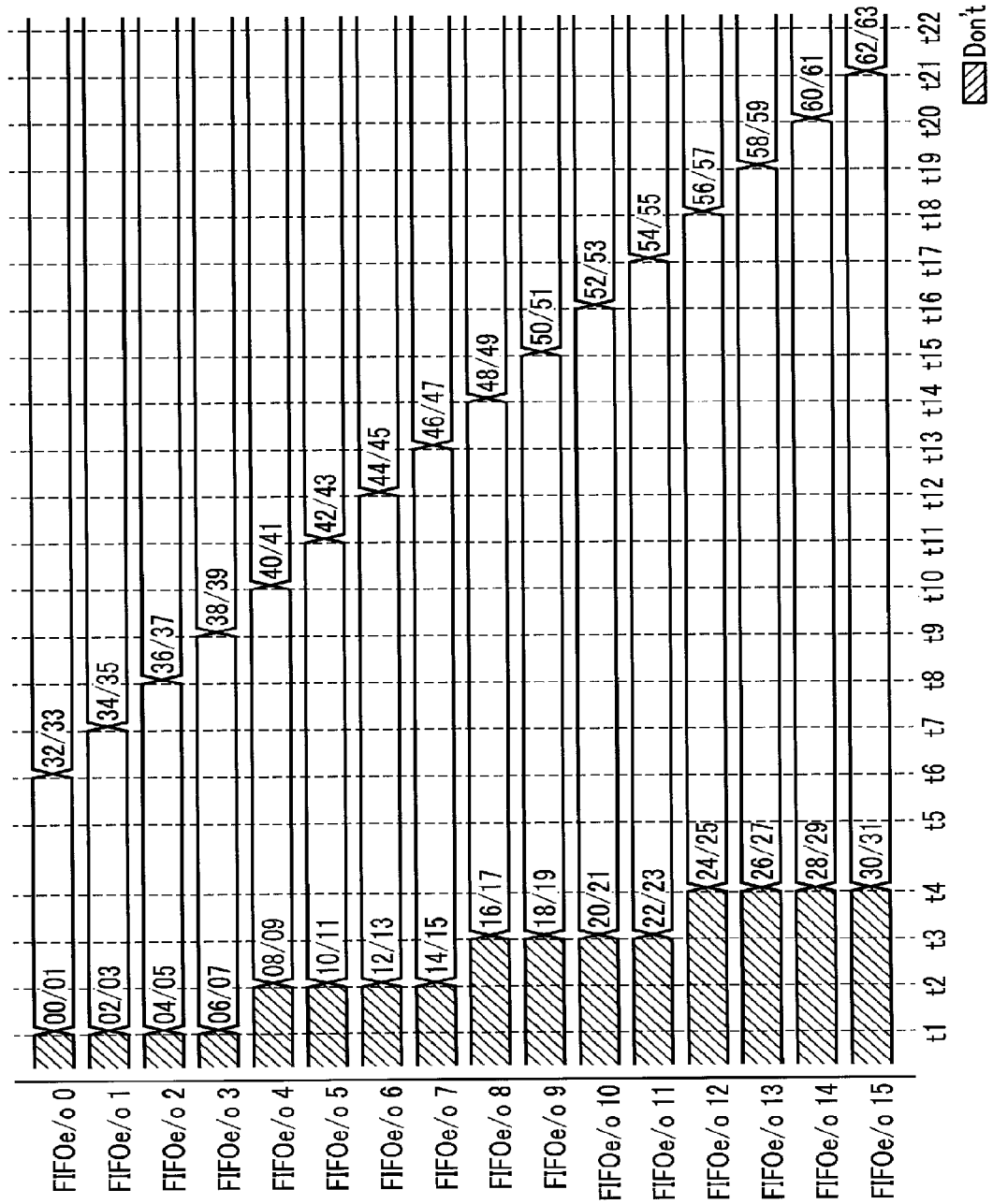
Figure 21C:
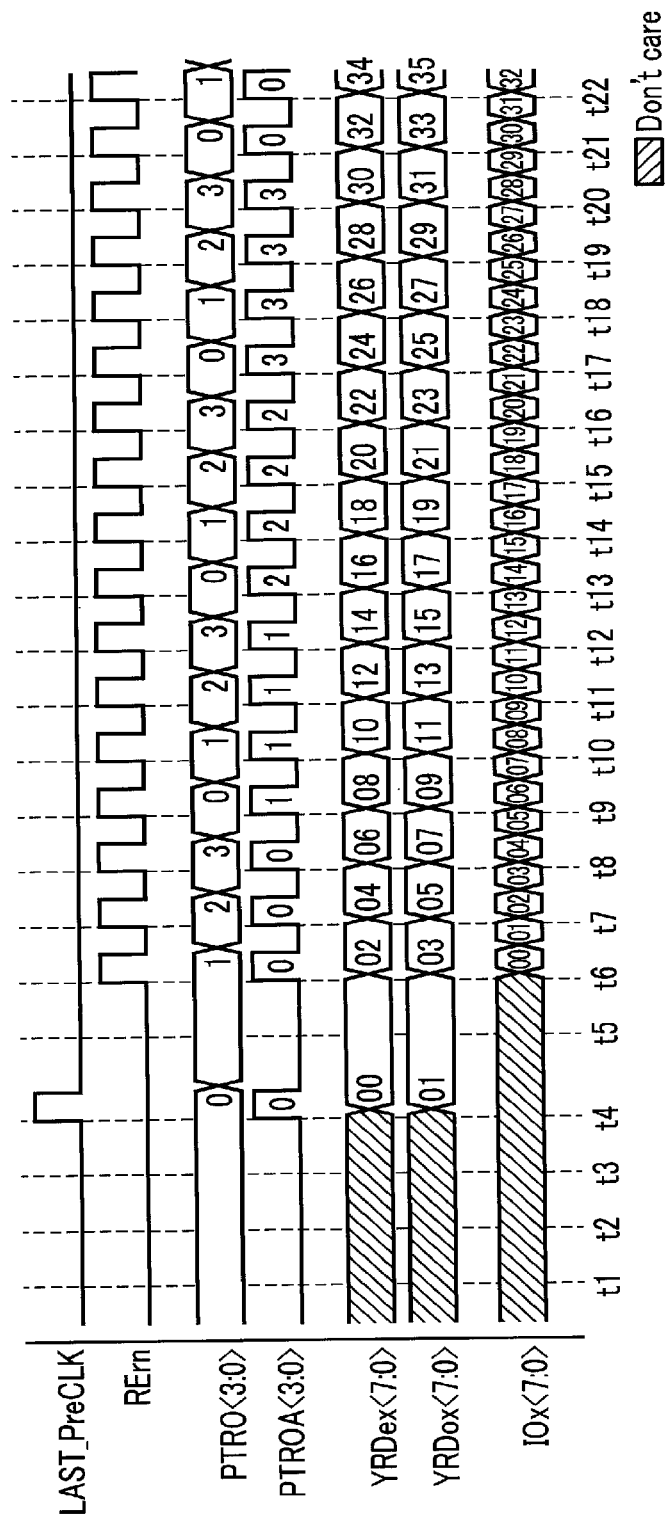

The data output in the register read will be described in detail with reference to FIGS. 21A, 21B, and 21C. FIGS. 21A to 21C are timing charts in the same time axis of times t1 to t22 and show different signals.

As illustrated, first, the REG_ID_GF_MUX 301 outputs the 8-byte data 00 to 07 to the data buses YRD_QP0<15:0> to the data buses YRD_QP3<15:0> at time t1. At times t2 to t4, the REG_ID_GF_MUX 301 outputs the data 08 to 31 by 8 bytes according to the rising timings of PICLK<0> to PICLK<3>.

At times t1 to t4, the FIFO_CNTL 305 transmits the signals PTRI0e/on<3:0> to PTRI3e/on<3:0> controlled by the clock signals PICLK<0> to PICLK<3> to the FIFO 304. For example, the counts "0" to "3" of the signals PTRI0e/on<3:0> of FIG. 21A indicate that the respective signals PTRI0e/on<0> to PTRI0e/on<3> are enabled. The count "0" of the signals PTRI0e/on<3:0> corresponds to the register FIFOe/o 0, the count "1" corresponds to FIFOe/o 4, the count "2" corresponds to FIFOe/o 8, and the count "3" corresponds to FIFOe/o 12. Similarly, the count "0" of the signals PTRI1e/on<3:0> corresponds to the register FIFOe/o 1, the count "1" corresponds to FIFOe/o 5, the count "2" corresponds to FIFOe/o 9, and the count "3" corresponds to FIFOe/o 13. The count "0" of the signals PTRI2e/on<3:0> corresponds to the register FIFOe/o 2, the count "1" corresponds to FIFOe/o 6, the count "2" corresponds to FIFOe/o 10, and the count "3" corresponds to FIFOe/o 14. The count "0" of the signals PTRI3e/on<3:0> corresponds to the register FIFOe/o 3, the count "1" corresponds to FIFOe/o 7, the count "2" corresponds to FIFOe/o 11, and the count "3" corresponds to FIFOe/o 15.

At times t1 to t4, the FIFO 304 sequentially fetches data 00 to 32 into the registers FIFOe/o 0 to FIFOe/o 15 by 8 bytes in response to the signals PTRI0e/on<3:0> to PTRI3e/on<3:0>. Therefore, the data fetch of the FIFO 304 at the four cycles of times t1 to t4 is completed.

The data transmission from the FIFO 304 to the OUTREG 322 is the same as that in FIGS. 13A to 13C.

2.4.2 ID Read

Figure 22B:
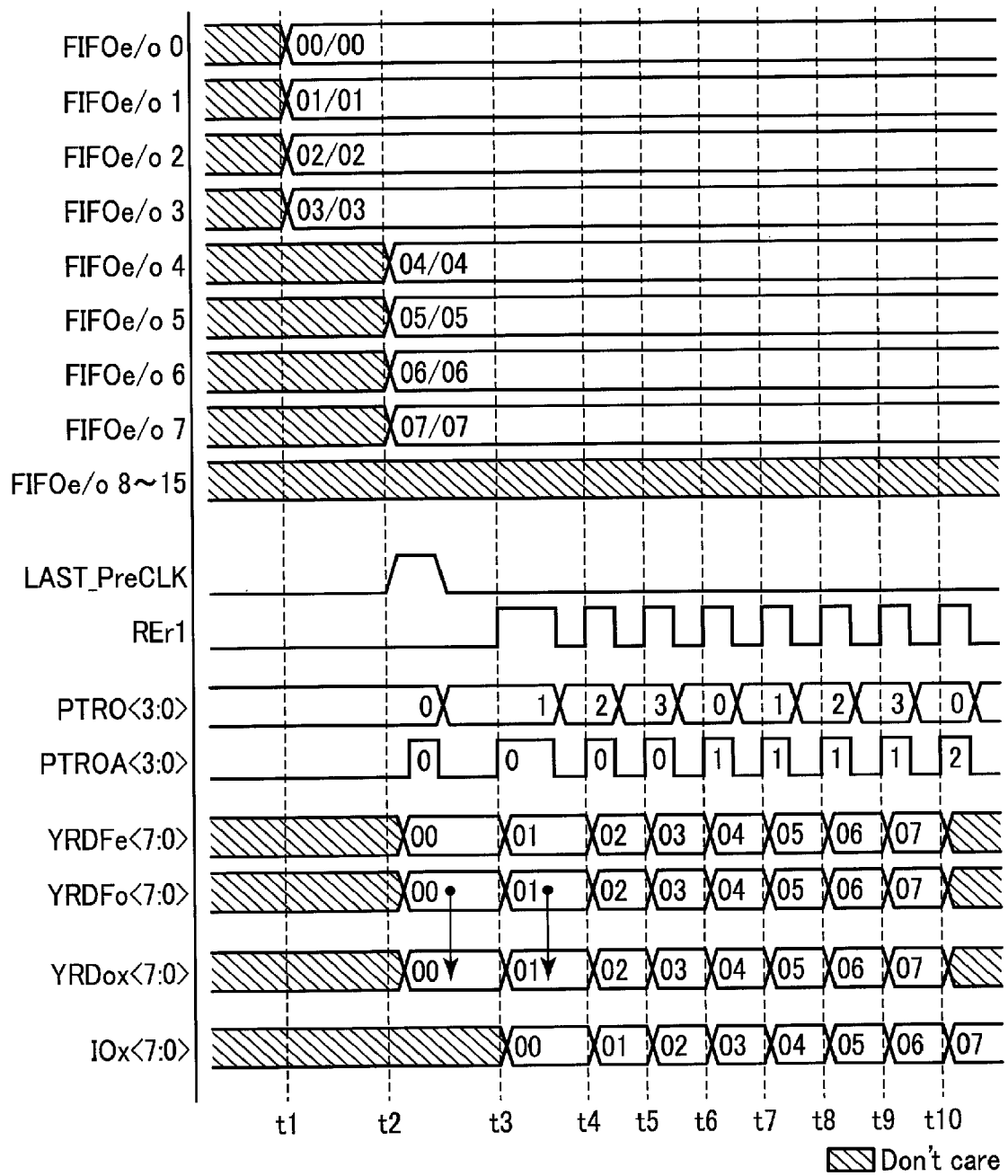

Next, the data output in the ID read will be described in detail with reference to FIGS. 22A and 22B. FIGS. 22A and 22B are timing charts in the same time axis of times t1 to t10 and show different signals.

As illustrated, before time t1, the REG_ID_GF_MUX 301 outputs the data 00 input from the data buses IDGF_DATA_B0<7:0> to the data buses YRD_QP0<7:0> and <15:8> (hereinafter, referred to as "data 00/00"). Similarly, the REG_ID_GF_MUX 301 outputs data 01 to 03 input from the data buses IDGF_DATA_B1<7:0> to IDGF_DATA_B3<7:0> to the data buses YRD_QP1<15:0> to YRD_QP3<15:0> as data 01/01, data 02/02, and data 03/03. The REG_ID_GF_MUX 301 performs the same processing on the data 04 to 07 between time t1 and time t2.

The FIFO_CNTL 305 transmits the signals PTRI0e/on<3:0> to PTRI3e/on<3:0> controlled by the clock signals PICLK<0> to PICLK<3>.

At time t1, the FIFO 304 first fetches the data 00/00 to 03/03 into the registers FIFOe/o 0 to FIFOe/o 3 in response to the signals PTRI0e/on<3:0> to PTRI3e/on<3:0>. Next, at time t2, the FIFO 304 fetches data 04/04 to 07/07 into the registers FIFOe/o 4 to FIFOe/o 7.

Next, at time t2, the FIFO_CNTL 305 sets the signal LAST_PreCLK to an "H" level. In addition, after setting the signal LAST_PreCLK to an "H" level, the FIFO_CNTL 305 transmits, to the FIFO 304, the signal in which both the signals PTRO<3:0> and the signals PTROA<3:0> are the count "0".

The FIFO 304 outputs the data 00 of the register FIFOe 0 to the data buses YRDFe<7:0> and outputs data 00 of the register FIFOo 0 to the data buses YRDFo<7:0>, in response to the signals PTRO<3:0> and the signals PTROA<3:0>.

The MUX_CNTL 321 outputs the data 00 of the data buses YRDFo<7:0> to the data buses YRDox<7:0>.

Subsequently, at time t3, the FIFO_CNTL 305 sets the signal PTROA<0> to an "H" level at the rising timings of the clock signal REr1, and counts up the signals PTRO<3:0> at the falling timings. Therefore, at times t3 to t9, the FIFO 304 sequentially outputs the data 01 to 07 held by the registers FIFOe/o 1 to FIFOe/o 7 to the data buses YRDFe<7:0> and the data buses YRDFo<7:0> at the rising timing of the clock signal REr1.

At times t3 to t10, the OUTREG 322 outputs input data from the data buses YRDox<7:0> to the input/output pads IOx<7:0>, according to the falling timing of the read enable signal REnx.

2.4.3 Get Feature

Figure 23B:
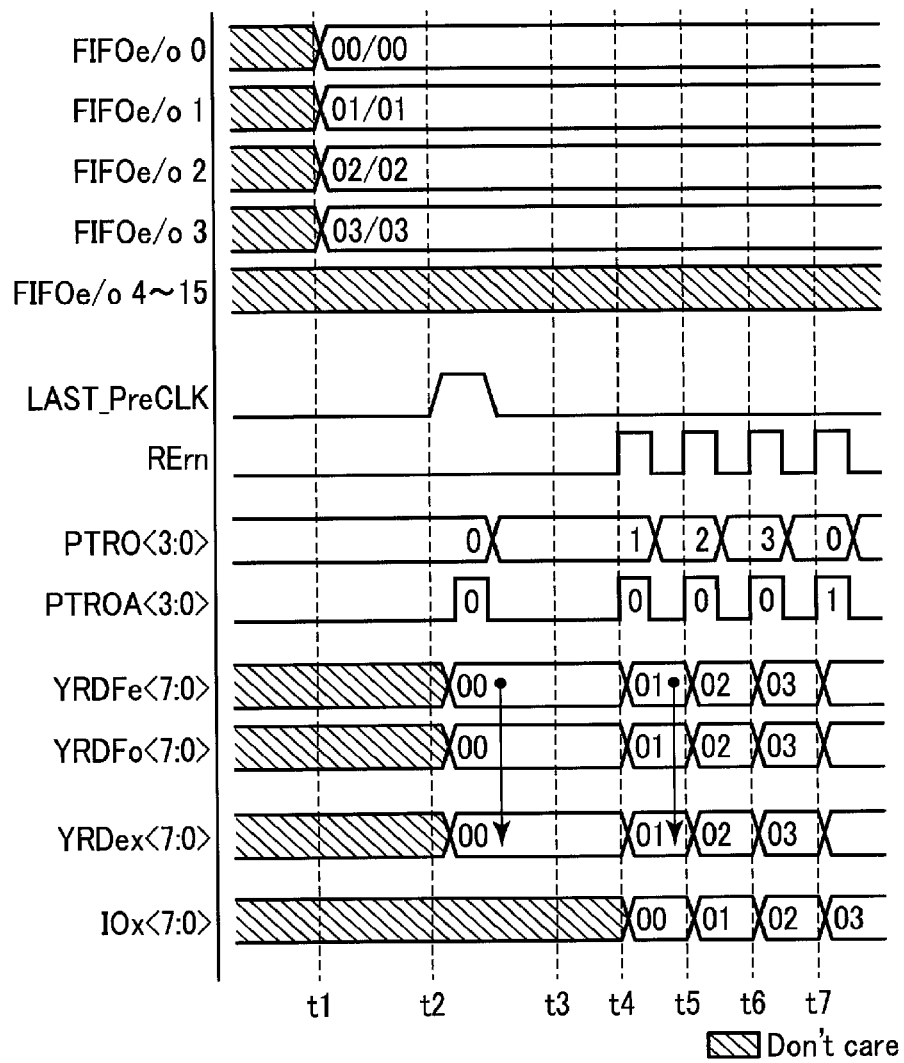

Next, the data output in the Get Feature will be described in detail with reference to FIGS. 23A and 23B. FIGS. 23A and 23B are timing charts in the same time axis of times t1 to t7 and show different signals.

As illustrated, as in the ID read, at time t1, first, the FIFO 304 fetches data 00/00 to 03/03 into the registers FIFOe/o 0 to FIFOe/o 3. Then, at time t2, when the signal LAST_PreCLK becomes an "H" level, the FIFO 304 outputs the data 00 of the register FIFOe 0 to the data buses YRDFe<7:0> and outputs the data 00 of the register FIFOo 0 to the data buses YRDFo<7:0>, in response to the signals PTRO<3:0> and the signals PTROA<3:0>.

The MUX_CNTL 321 outputs the data 00 of the data buses YRDFe<7:0> to the data buses YRDex<7:0>.

Subsequently, at times t4 to t6, the FIFO_CNTL 305 sets the signal PTROA<0> to an "H" level at the rising timings of the clock signal REm, and counts up the signals PTRO<7:0> at the falling timings. Therefore, the FIFO 304 sequentially outputs the data 01 to 03 held by the registers FIFOe/o 1 to FIFOe/o 3 to the data buses YRDex<7:0> and the data buses YRDox<7:0> at the rising timing of the clock signal REm.

At times t4 to t7, the OUTREG 322 outputs input data from the data buses YRDex<7:0> to the input/output pads IOx<7:0>, according to the rising timing of the read enable signal REnx.

2.4 Effects of Present Embodiment

In the configuration according to the present embodiment, the same effect as the above-described embodiment can be obtained.

Furthermore, in the configuration according to the present embodiment, the input and output of the memory data in the REG_ID_GF_MUX 301 is performed on the 64-bit data buses. Therefore, upon the register read, when the memory data is transmitted from the REG_ID_GF_MUX 301 to the FIFO 304, the data fetch time in the FIFO 304 can be further shortened than in the case of using the 32-bit data buses. Therefore, the period tWHR2 can be shortened and the processing time of the register read can be shortened.

Furthermore, in the configuration according to the present embodiment, the same data can be transmitted to the data buses YRDFe<7:0> and YRDFo<7:0> upon the ID read and the Get Feature. Therefore, in the MUX_CNTL 321, the function of switching the data buses YRDFe<7:0> and YRDFo<7:0> is unnecessary, thereby simplifying the circuit and suppressing an increase in the area of the semiconductor device.

3. Modifications or the Like

The semiconductor device according to the above-described embodiment includes an input/output circuit (10 in FIG. 1) electrically connected to an external controller. The input/output circuit includes: a first circuit (301 in FIG. 2) configured to electrically connect one of first data bus (IDGF_DATA_B* in FIG. 2) input one of first (ID data) and second data (GF data) and second data bus (YIO_QP* in FIG. 2) input a third data (memory data) with a third data bus (YRD_QP* in FIG. 2), and electrically connect the one of first signal line input a first clock signal (PICLK_IDGF in FIG. 2) and second signal line input a second clock signal (PICLK_QP* in FIG. 2) with a third signal line (PICLK<*> in FIG. 2); a second circuit (304 in FIG. 2) configured to output one of first to third data, which are input from the third data bus, in a first-in-first-out (FIFO) format; and a third circuit (303 in FIG. 2) configured to generate the first clock signal and supply the first clock signal to the first circuit through the first signal line. When the one of the first and second data is read, the second circuit receives the one of the first and second data in response to the first clock signal within a period (tWHR1 or tFEAT) until a first signal (REnx) is received after a read command and address data are received from the external controller. When the third data is read, the second circuit receives the third data in response to the second clock signal within the period (tWHR2).

By applying the above-described embodiments, the semiconductor device capable of achieving the high-speed data output cycle can be provided. The embodiments are not limited to the above-described aspects and various modifications can be made thereto.

For example, in the above-described embodiments, the ID data is output at the falling timing of the read enable signal REnx and the GF data is output at the rising timing of the read enable signal REnx, but is not limited thereto. For example, the ID data may be output at the rising timing of the read enable signal REnx and the GF data may be output at the falling timing of the read enable signal REnx.

Furthermore, in the above-described embodiments, the case where the data in the same page is continuously read twice in the register read has been described, but the read operation is not limited thereto. For example, data of different pages may be read, the number of readings may be one time or may be three times or more. In addition, for example, the case where only the page read is performed by the one-time read operation can be applied.

Furthermore, in the above-described embodiments, instead of providing the period tWHR2, the period tWHR1, and the period tFEAT, the ready/busy signal R/Bn may be set at an "L" level and the read enable signal REnx may be set at an "H" level.

Furthermore, in the above-described embodiments, the memory data is output at the DDR and the ID data and the GF data are output at the SDR, but the output method is not limited thereto. For example, the memory data may be output at the SDR. The ID data and the GF data may be output at the DDR.

Furthermore, in the above-described embodiments, the OSC 303 generates the clock signal PICLK_IDGF associated with the ID data or the GF data, but may generate a clock signal associated with the memory data. For example, the clock signals PICLK_QP01_C and the PICLK_QP23_C may be generated.

Furthermore, in the above-described embodiments, the case of reading the memory data, the ID data, and the GF data has been described, but the read data is not limited thereto. In addition, the output data (signal) is not limited to three, and may be two or four or more. For example, in the case of reading the status information as the fourth data, the status data may be input to the ID_GF_SEL 302, the status data enable signal may be input to the ID_GF_SEL 302 and the REG_ID_GF_MUX 301, and the status data may be output in response to the status data enable signal.

The above-described embodiments can also be applied to semiconductor devices including memories other than the NAND flash memory. Furthermore, the semiconductor device may not include the memory, and it is possible to apply to various semiconductor devices including a plurality of data output paths.

Furthermore, the terms "connect" and "couple" in the above-described embodiments include a state of being indirectly connected by interposing other elements such as transistors or resistors therebetween.

Each embodiment according to the present invention may be provided as follows. For example, when the memory cell transistor MT can hold 2-bit (four-value) data, and a threshold value level when one of the four values is held is set at an E level (erase level), an A level, a B level, and a C level in descending order.

(1) In Read Operation

A voltage applied to a word line selected by an A-level read operation is, for example, 0 V to 0.55 V. The voltage is not limited thereto and may be one of 0.1 V to 0.24 V, 0.21 V to 0.31 V, 0.31 V to 0.4 V, 0.4 V to 0.5 V, and 0.5 V to 0.55 V.

A voltage applied to a word line selected by a B-level read operation is, for example, 1.5 V to 2.3 V. The voltage is not limited thereto and may be one of 1.65 V to 1.8 V, 1.8 V to 1.95 V, 1.95 V to 2.1 V, and 2.1 V to 2.3 V.

A voltage applied to a word line selected by a C-level read operation is, for example, between 3.0 V and 4.0 V. The voltage is not limited thereto and may be one of 3.0 V to 3.2 V, 3.2 V to 3.4 V, 3.4 V to 3.5 V, 3.5 V to 3.6 V, and 3.6 V to 4.0 V.

The time (tR) of the read operation may be, for example, 25 µs to 38 µs, 38 µs to 70 µs, or 70 µs to 80 µs.

(2) The write operation includes the program operation and the verify operation as described above. In the write operation, a voltage applied initially to a word line selected by a program operation is, for example, 13.7 to 14.3 V. The voltage is not limited thereto and may be one of 13.7 V to 14.0 V and 14.0 V to 14.6 V.

A voltage applied initially to a selected word line when writing an odd word line and a voltage applied initially to a selected word line when writing an even word line may be changed.

When the program operation is an incremental step pulse program (ISPP), a step-up voltage may be, for example, about 0.5 V.

A voltage applied to an unselected word line is, for example, 6.0 V to 7.3 V. The voltage is not limited thereto and may be 7.3 V to 8.4 V or may be 6.0 V or less.

The applied path voltage may be changed according to whether the unselected word line is an odd word line or an even word line.

The time (tProg) of the write operation may be, for example, 1700 µs to 1800 µs, 1800 µs to 1900 µs, or 1900 µs to 2000 µs.

(3) In the erase operation,

A voltage applied initially to a well which is formed on a semiconductor substrate and on which the memory cell is disposed is, for example, 12 V to 13.6 V. The voltage is not limited thereto and may be 13.6 V to 14.8 V, 14.8 V to 19.0 V, 19.0 V to 19.8 V, 19.8 V to 21 V.

The time (tErase) of the erase operation may be, for example, 3000 µs to 4000 µs, 4000 µs to 5000 µs, or 4000 µs to 9000 µs.

(4) The configuration of the memory cell includes a charge accumulation layer disposed through a tunnel insulation film having a thickness of 4 to 10 nm on a semiconductor substrate (silicon substrate). The charge accumulation layer may have a stacked structure including an insulation film such as SiN or SiON having a thickness of 2 to 3 nm and a polysilicon having a thickness of 3 to 8 nm. In addition, a metal such as Ru may be added to the polysilicon. The insulation film is provided on the charge accumulation layer. The insulation film includes, for example, a silicon oxide film having a thickness of 4 to 10 nm, which is interposed between a lower high-k film having a thickness of 3 to 10 nm and an upper high-k film having a thickness of 3 to 10 nm. Examples of the high-k film include HfO. In addition, the thickness of the silicon oxide film may be thicker than the thickness of the high-k film. A control electrode having a thickness of 30 nm to 70 nm is formed on the insulation film through a material for adjusting a work function, which has a thickness of 3 to 10 nm. The material for adjusting the work function is a metal oxide film such as TAO, a metal nitride film such as TaN, or the like. W or the like may be used in the control electrode.

In addition, air gap may be formed between the memory cells.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A semiconductor device comprising:
   a memory:
   a data register coupled to the memory;
   an input/output circuit coupled to the data register and configured to input and output data to and from an external controller which issues and transmits a command to the device,
   wherein the input/output circuit includes:
   a first clock generator configured to generate a first clock signal and transmit the first clock signal to a first signal line,
   a first selector configured to receive first data from a first bus, receive second data from a second bus, and transmit one of the first and second data to a third bus,
   a second selector configured to receive the one of the first and second data from the third bus, receive third data from a fourth bus, receive the first clock signal corresponding to the first and second data from the first signal line, receive a second clock signal corresponding to the third data from a second signal line, transmit one of the first to third data to a fifth bus, and transmit one of the first and second clock signals to a third signal line; and
   a first-in-first-out (FIFO) circuit configured to receive the one of the first to third data from the fifth bus and receive the one of the first and second clock signals from the third signal line,
   when a read operation of the one of the first and second data is executed, the FIFO circuit receives the one of the first and second data in response to the first clock signal within a period from when a read command and address data are received until a read enable signal is received from the external controller, and
   when a read operation of the third data is executed, the FIFO circuit receives the third data in response to the second clock signal within the period.

2. The device according to claim 1, wherein
   the input/output circuit further includes:
   second clock generator configured to generate third and fourth clock signals which are mutually opposite-phase and synchronized with each other, based on the read enable signal; and
   an output register configured to output the one of the first to third data which is received from the FIFO circuit in response to the third and/or fourth clock signal which is received from the second clock generator.

3. The device according to claim 1, wherein
   the first and second selectors receive a first data enable signal and a second data enable signal,
   when the first data enable signal is at a first logic level, the first selector transmits the first data to the second selector, and the second selector transmits the first data and the first clock signal to the FIFO circuit,
   when the second data enable signal is at the first logic level, the first selector transmits the second data to the second selector, and the second selector transmits the second data and the first clock signal to the FIFO circuit, and when neither the first data enable signal nor the second data enable signal are at the first logic level, the second selector transmits the third data and the second clock signal to the FIFO circuit.

4. The device according to claim 1, wherein the FIFO circuit ends the receiving of the one of the first and second data within the period.

5. The device according to claim 1,
wherein the first data includes identification data of the device,
the second data includes parameter data of the device, and
the third data includes data stored in the memory.

6. The device according to claim 2, wherein the output register receives the one of the first to third data within the period.

7. The device according to claim 2, wherein
the input/output circuit further includes a FIFO controller configured to control the FIFO circuit,
the FIFO circuit includes a plurality of internal registers configured to hold the first to third data,
the FIFO controller includes:
an input address register configured to hold input addresses of the internal registers which received the one of the first to third data from the second selector; and
an output address register configured to hold output addresses of the internal registers which transmit the one of the first to third data to the output register, and
the FIFO controller resets the input addresses held by the input address register and the output addresses held by the output address register according to the reception of the read command or the address data.

8. The device according to claim 2, wherein
the input/output circuit further includes a third selector coupled to the FIFO circuit through sixth and seventh buses and coupled to the output register through eighth and ninth buses, when the third selector receives the first data from the FIFO circuit through the sixth and seventh buses, the third selector transmits the received first data to the output register through the eighth bus, when the third selector receives the second data from the FIFO circuit through the sixth and seventh buses, the third selector transmits the received second data to the output register through the ninth bus, and when the third selector receives the third data from the FIFO circuit through the sixth and seventh buses, the third selector transmits the third data received from the sixth bus to the output register through the eighth bus and transmits the third data received from the seventh bus to the output register through the ninth bus.

9. The device according to claim 2, wherein,
in the reading operation of the first data, the output register outputs the first data according to a falling timing of the read enable signal.

10. The device according to claim 2, wherein,
in the reading operation of the second data, the output register outputs the second data according to a rising timing of the read enable signal.

11. The device according to claim 3, wherein
the first bus includes first and second data lines,
the third bus includes a third data line,
the first clock generator supplies data select signal to the first selector, and
the first selector switches a connection of the first and second data lines with the third data line in response to the data select signal.

12. The device according to claim 7, wherein
the second clock generator is configured to generate a fifth clock signal based on the read enable signal, and
the FIFO controller determines the input addresses in response to one of the first and second clock signals and determines the output addresses in response to the fifth clock signal.

* * * * *